United States Patent
Kurokawa et al.

(10) Patent No.: US 12,216,363 B2
(45) Date of Patent: Feb. 4, 2025

(54) LIQUID CRYSTAL LIGHT CONTROL DEVICE

(71) Applicant: Japan Display Inc., Tokyo (JP)

(72) Inventors: Tae Kurokawa, Tokyo (JP); Takeo Koito, Tokyo (JP); Kojiro Ikeda, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/231,306

(22) Filed: Aug. 8, 2023

(65) Prior Publication Data

US 2023/0375883 A1    Nov. 23, 2023

Related U.S. Application Data

(63) Continuation of application No. PCT/JP2022/004747, filed on Feb. 7, 2022.

(30) Foreign Application Priority Data

Feb. 18, 2021 (JP) ................... 2021-024713

(51) Int. Cl.
  *G02F 1/1343* (2006.01)
  *G02F 1/1337* (2006.01)
  *G02F 1/1347* (2006.01)

(52) U.S. Cl.
  CPC ...... *G02F 1/134309* (2013.01); *G02F 1/1337* (2013.01); *G02F 1/134363* (2013.01); *G02F 1/1347* (2013.01); *G02F 1/13471* (2013.01)

(58) Field of Classification Search
  CPC ............. G02F 1/134309; G02F 1/1337; G02F 1/1347; G02F 1/134363; G02F 1/13471
  See application file for complete search history.

(56) References Cited

U.S. PATENT DOCUMENTS

2005/0243237 A1    11/2005   Sasuga
2016/0000557 A1    1/2016    Galstian et al.
(Continued)

FOREIGN PATENT DOCUMENTS

| JP | H07-64081 A | 3/1995 |
| JP | 2010-230887 A | 10/2010 |
| JP | 2016-506541 A | 3/2016 |

OTHER PUBLICATIONS

English translation of Office Action issued in related Japanese Patent Application No. 2023-500745 dated Apr. 2, 2024. 4 pages.

(Continued)

*Primary Examiner* — Nathanael R Briggs
(74) *Attorney, Agent, or Firm* — K&L Gates LLP

(57) ABSTRACT

A liquid crystal light control device in an embodiment according to the present invention includes a first liquid crystal cell, a second liquid crystal cell overlapping the first liquid crystal cell, a third liquid crystal cell overlapping the second liquid crystal cell, and a fourth liquid crystal cell overlapping the third liquid crystal, each of the first liquid crystal cell, the second liquid crystal cell, the third liquid crystal cell, and the fourth liquid crystal cell includes a first substrate arranged with a first electrode having a strip pattern, a second substrate arranged with a second electrode having a strip pattern, and a liquid crystal layer between the first substrate and the second substrate. The first substrate and the second substrate are arranged with a longitudinal direction of the strip pattern of the first electrode and second electrode intersecting.

9 Claims, 25 Drawing Sheets

(56) References Cited

U.S. PATENT DOCUMENTS

2019/0025657 A1* 1/2019 Presniakov ....... G02F 1/133504
2019/0033669 A1 1/2019 Presniakov et al.

OTHER PUBLICATIONS

International Search Report issued in International Patent Application No. PCT/JP2022/004747 on Apr. 12, 2022 and English translation of same. 5 pages.
Written Opinion issued in International Patent Application No. PCT/JP2022/004747 on Apr. 12, 2022. 4 pages.
English translation of Office Action dated Oct. 30, 2024 issued in related Korean Patent Application No. 10-2023-7026551. 6 pages.
Office Action dated Nov. 6, 2024 issued in Canadian Patent Appication No. 3207954. 5 pages.
Extended European Search Report issued in related European Patent Application No. 22756005.9, dated Dec. 9, 2024. 8 pages.

\* cited by examiner

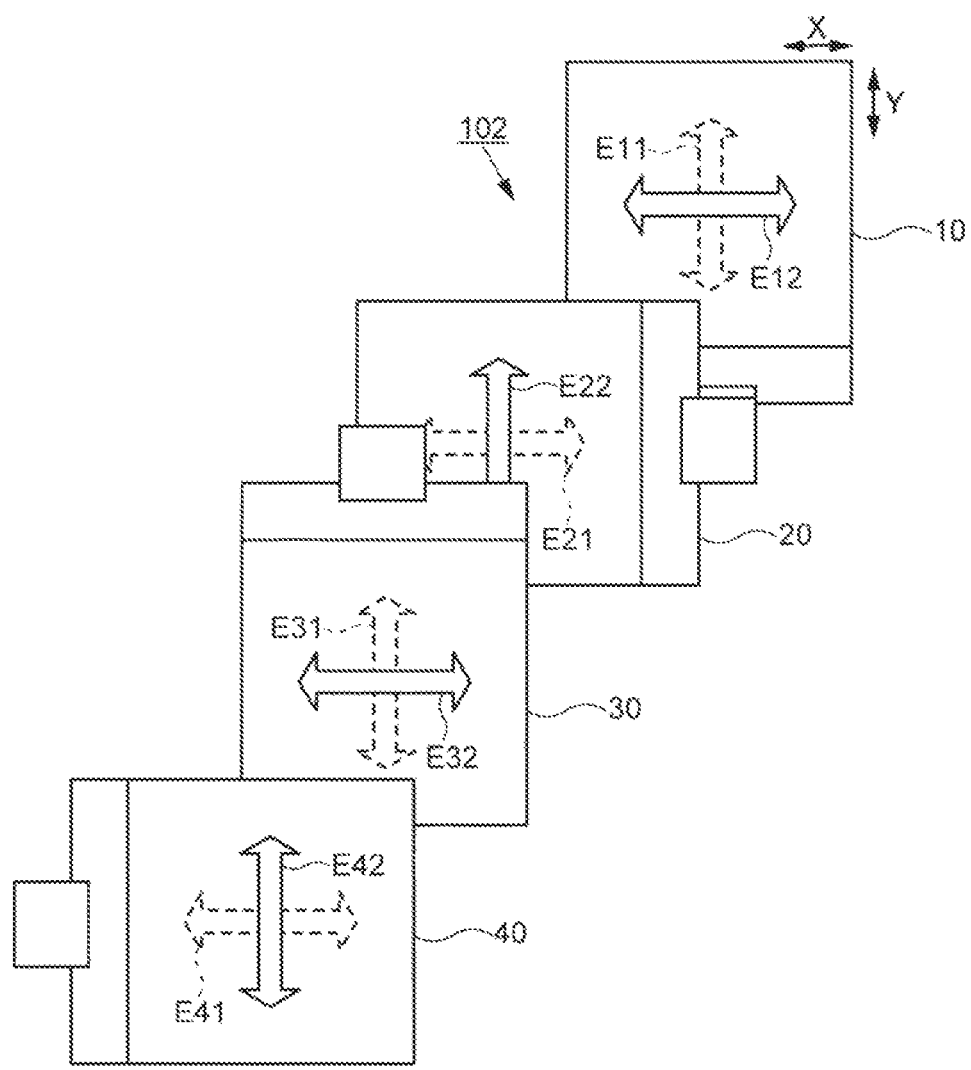

LIQUID CRYSTAL LIGHT CONTROL DEVICE

CROSS-REFERENCE TO RELATED APPLICATIONS

This application is a Continuation of International Patent Application No. PCT/JP2022/004747, filed on Feb. 7, 2022, which claims the benefit of priority to Japanese Patent Application No. 2021-024713, filed on Feb. 18, 2021, the entire contents of which are incorporated herein by reference.

FIELD

An embodiment of the present invention relates to a device that controls the light distribution of light emitted from a light source using the electrooptical effect of liquid crystals.

BACKGROUND

There is known technology to control light distribution of light emitted from a light source by using liquid crystal lenses. For example, a lighting device that controls the spread of light emitted from a light source by using a liquid crystal cell with concentric circular electrodes is disclosed (refer to Japanese Unexamined Patent Application Publication No. 2010-230887, Japanese Unexamined Patent Application Publication No. 2005-317879).

Since the refraction angle of light changes with wavelength, when light emitted from a light source is diffused through a liquid crystal lens, a rainbow-colored pattern may be visible on the contour of the illuminated area. This phenomenon is also known as "color breakup", and the quality of the illumination light through the liquid crystal lens has become a problem.

SUMMARY

A liquid crystal light control device in an embodiment according to the present invention includes a first liquid crystal cell, a second liquid crystal cell overlapping the first liquid crystal cell, a third liquid crystal cell overlapping the second liquid crystal cell, and a fourth liquid crystal cell overlapping the third liquid crystal, each of the first liquid crystal cell, the second liquid crystal cell, the third liquid crystal cell, and the fourth liquid crystal cell includes a first substrate arranged with a first electrode having a strip pattern, a second substrate arranged with a second electrode having a strip pattern, and a liquid crystal layer between the first substrate and the second substrate. The first substrate and the second substrate are arranged with a longitudinal direction of the strip pattern of the first electrode and second electrode intersecting, and two of the first liquid crystal cell, the second liquid crystal cell, the third liquid crystal cell, and the fourth liquid crystal cell are arranged with the longitudinal direction of the strip pattern of the first electrode parallel to a first direction, and the longitudinal direction of the strip pattern of the first electrode of the other two liquid crystal cells is parallel to a second direction that intersects the first direction.

BRIEF DESCRIPTION OF DRAWINGS

FIG. 16A is an arrangement of a plurality of liquid crystal cells configuring a liquid crystal light control element according to an embodiment of the present invention, with a first liquid crystal cell to a fourth liquid crystal cell rotated by 90 degrees.

DESCRIPTION OF EMBODIMENTS

Hereinafter, embodiments of the present invention are described with reference to the drawings. However, the present invention can be implemented in many different aspects, and should not be construed as being limited to the description of the following embodiments. For the sake of clarifying the explanation, the drawings may be expressed schematically with respect to the width, thickness, shape, and the like of each part compared to the actual aspect, but this is only an example and does not limit the interpretation of the present invention. For this specification and each drawing, elements similar to those described previously with respect to previous drawings may be given the same reference sign (or a number followed by a, b, etc.) and a detailed description may be omitted as appropriate. The terms "first" and "second" appended to each element are a convenience sign used to distinguish them and have no further meaning except as otherwise explained.

As used herein, where a member or region is "on" (or "below") another member or region, this includes cases where it is not only directly on (or just under) the other member or region but also above (or below) the other member or region, unless otherwise specified. That is, it includes the case where another component is included in between above (or below) other members or regions.

Figure 1:
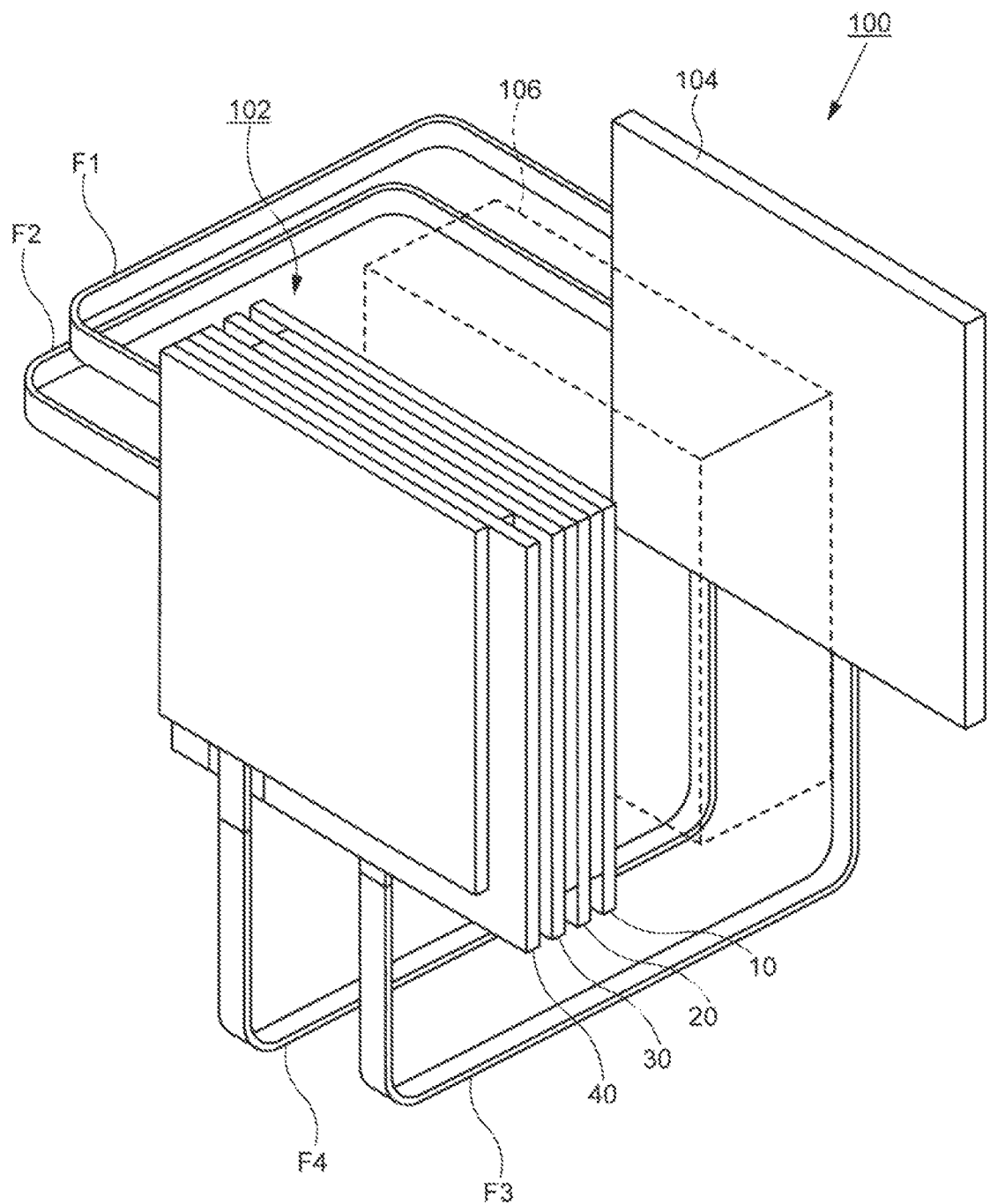
FIG. 1 is a schematic diagram of a configuration of a liquid crystal light control device according to an embodiment of the present invention.

FIG. 1 shows a diagram of a liquid crystal light control device 100 according to an embodiment of the present invention. The liquid crystal light control device 100 includes a liquid crystal light control element 102 and a circuit board 104. The liquid crystal light control element 102 includes a plurality of liquid crystal cells. In this embodiment, the liquid crystal light control element 102 includes at least four liquid crystal cells.

FIG. 1 shows a configuration in which the liquid crystal light control element 102 is configured with a first liquid crystal cell 10, a second liquid crystal cell 20, a third liquid crystal cell 30, and a fourth liquid crystal cell 40. The first liquid crystal cell 10, the second liquid crystal cell 20, the third liquid crystal cell 30, and the fourth liquid crystal cell 40 are flat panels, and the flat surfaces of the respective liquid crystal cells are arranged overlapping each other. Transparent adhesive layers, not shown, are arranged between the first liquid crystal cell 10 and the second liquid crystal cell 20, between the second liquid crystal cell 20 and the third liquid crystal cell 30, and between the third liquid crystal cell 30 and the fourth liquid crystal cell 40. The liquid crystal light control element 102 has a structure in which the liquid crystal cells arranged adjacent to each other in the front and rear are bonded to each other by the transparent adhesive layer.

The circuit board 104 includes a circuit that drives the liquid crystal light control element 102. The first liquid crystal cell 10 is connected to the circuit substrate 104 by a first flexible wiring substrate F1, the second liquid crystal cell 20 is connected to the circuit substrate 104 by a second flexible wiring substrate F2, the third liquid crystal cell 30 is connected to the circuit substrate 104 by a third flexible wiring substrate F3, and the fourth liquid crystal cell 40 is connected to the circuit board 104 by a fourth flexible wiring substrate F4. The circuit board 104 outputs control signals to each liquid crystal cell to control the alignment state of the liquid crystal via the flexible wiring substrates.

A light source unit 106 is arranged on the rear side of the liquid crystal light control element 102 in the liquid crystal light control device 100 shown in FIG. 1. The liquid crystal light control device 100 is configured so that light emitted from the light source unit 106 is emitted through the liquid crystal light control element 102 to the front side of the drawing. The liquid crystal light control element 102 has the first liquid crystal cell 10, the second liquid crystal cell 20, the third liquid crystal cell 30, and the fourth liquid crystal cell 40 arranged in this order from the side of the light source unit 106.

The light source unit 106 includes a white light source, and an optical element such as a lens may be arranged between the white light source and the liquid crystal light control element 102, as required. The white light source is a light source that radiates light close to natural light, and may be a light source that radiates dimmed light such as daylight white or a light bulb color. The liquid crystal light control device 100 functions to control the diffusion direction of light emitted from the light source unit 106 by the liquid crystal light control element 102. The liquid crystal light control element 102 has the function of shaping the light emitted from the light source unit 106 into a light distribution pattern, such as a square shape, cross shape, line shape, and the like.

Figure 2:
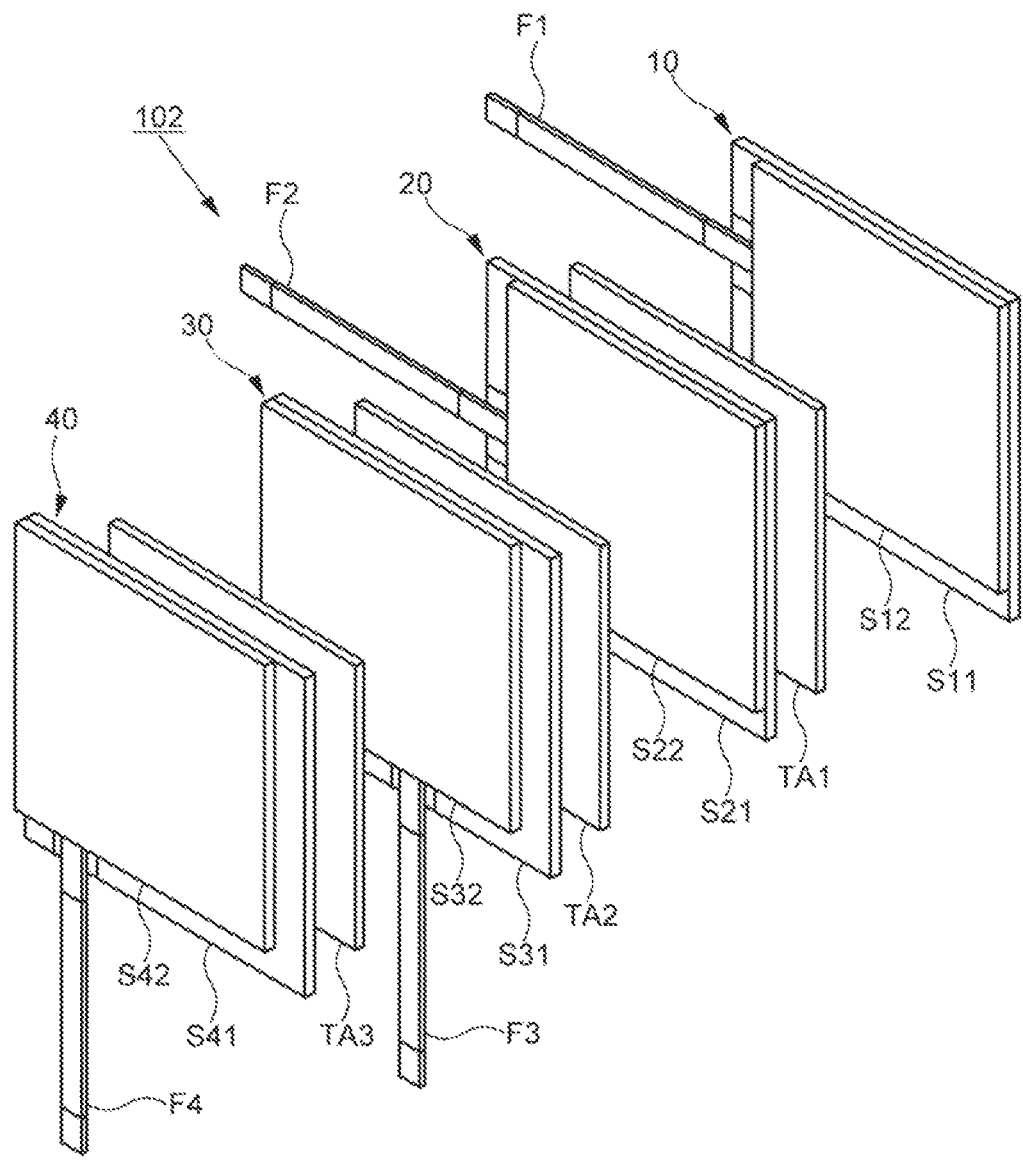
FIG. 2 is an illustration of a development of a liquid crystal light control element that configures a liquid crystal light control device according to an embodiment of the present invention.

FIG. 2 shows a development of the liquid crystal light control element 102 shown in FIG. 1. The liquid crystal light control element 102 includes the first liquid crystal cell 10, the second liquid crystal cell 20, the third liquid crystal cell 30, and the fourth liquid crystal cell 40.

The first liquid crystal cell 10 includes a first substrate S11 and a second substrate S12. The first substrate S11 and the second substrate S12 are arranged facing and with a gap therebetween. A liquid crystal layer, not shown, is arranged in the gap between the first substrate S11 and the second substrate S12. The first flexible wiring substrate F1 is connected to the first substrate S11.

The second liquid crystal cell 20 includes a first substrate S21, a second substrate S22, and the second flexible wiring substrate F2, and has the same configuration as the first liquid crystal cell 10. The third liquid crystal cell 30 includes a first substrate S31, a second substrate S32, and the third flexible wiring substrate F3, and has the same configuration as the first liquid crystal cell 10. The fourth liquid crystal cell 40 includes a first substrate S41, a second substrate S42, and the fourth flexible wiring substrate F4, and has the same configuration as the first liquid crystal cell 10.

A first transparent adhesive layer TA1 is arranged between the first liquid crystal cell 10 and the second liquid crystal cell 20. The first transparent adhesive layer TA1 transmits visible light and bonds the second substrate S12 of the first liquid crystal cell 10 and the first substrate S21 of the second liquid crystal cell 20. The second transparent adhesive layer TA2 is arranged between the second liquid crystal cell 20 and the third liquid crystal cell 30. The second transparent adhesive layer TA2 transmits visible light and bonds the second substrate S22 of the second liquid crystal cell 20 and the first substrate S31 of the third liquid crystal cell 30. A third transparent adhesive layer TA3 is arranged between the third liquid crystal cell 30 and the fourth liquid crystal cell 40. The third transparent adhesive layer TA3 transmits visible light and bonds the second substrate S32 of the third liquid crystal cell 30 and the first substrate S41 of the fourth liquid crystal cell 40.

The first transparent adhesive layer TA1, the second transparent adhesive layer TA2, and the third transparent adhesive layer TA3 preferably have high transmittance and a refractive index close to that of the first substrate S11, S21, S31, S41 and the second substrate S12, S22, S23, and S24. An optical elasticity resin can be used as the first transparent adhesive layer TA1, the second transparent adhesive layer TA2, and the third transparent adhesive layer TA3, for example, an adhesive material including acrylic resin with translucent properties. Since the temperature of the liquid crystal light control element 102 rises due to heat radiated from the light source unit 106, the coefficient of thermal expansion of the first transparent adhesive layer TA1, the second transparent adhesive layer TA2, and the third transparent adhesive layer TA3 preferably has a value close to that of the first substrate and the second substrate.

However, since the coefficient of thermal expansion of the first transparent adhesive layer TA1, the second transparent adhesive layer TA2, and the third transparent adhesive layer TA3 is often higher than that of the glass substrate, for example, stress relaxation when the temperature rises must be considered. It is preferable that the thicknesses of the first transparent adhesive layer TA1, second transparent adhesive layer TA2, and third transparent adhesive layer TA3 be thicker than the cell gap (thickness of the liquid crystal layer) of each liquid crystal cell (first liquid crystal cell 10, second liquid crystal cell 20, third liquid crystal cell 30, fourth liquid crystal cell 40) in order to mitigate thermal stress when the temperature rises.

As described below, the first liquid crystal cell 10, the second liquid crystal cell 20, the third liquid crystal cell 30, and the fourth liquid crystal cell 40 have substantially the same structure. The liquid crystal light control element 102 has a structure in which the third liquid crystal cell 30 and the fourth liquid crystal cell 40 overlap with respect to the first liquid crystal cell 10 and the second liquid crystal cell 20 rotated by 90 degrees. In other words, the liquid crystal light control element 102 includes a plurality of liquid crystal cells and includes a structure in which at least one liquid crystal cell and other liquid crystal cells adjacent to (overlapping) at least one liquid crystal cell is arranged in a rotated state within a range of 90±10 degrees. The above rotation angle of the third liquid crystal cell 30 and the fourth liquid crystal cell 40 can be set in the range of 90±10 degrees.

FIG. 2 shows that the third liquid crystal cell 30 and the fourth liquid crystal cell 40 are arranged with respect to the arrangement of the first liquid crystal cell 10 and the second liquid crystal cell 20, which are rotated by 90 degrees. On the other hand, it can be noted that when the third liquid crystal cell 30 and the fourth liquid crystal cell 40 are taken as a reference, the first liquid crystal cell 10 and the second liquid crystal cell 20 are arranged in a position rotated by 90 degrees. It is possible to change the arrangement of the electrodes and to change the diffusion of light passing through the stacked liquid crystal cells, by stacking a plurality of liquid crystal cells having the same electrode patterns and rotating some of the liquid crystal cells. The details are described below.

Figure 3:
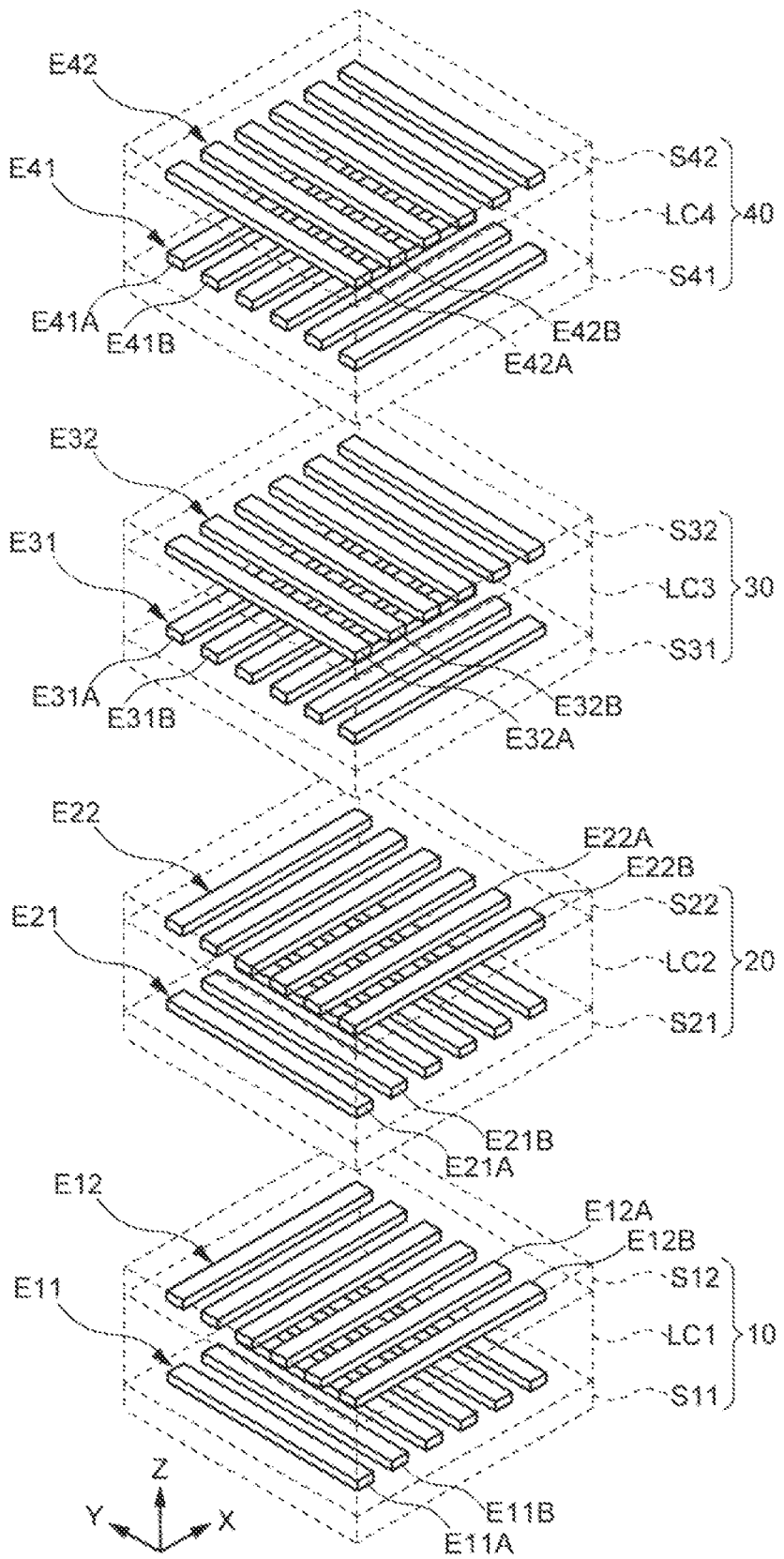
FIG. 3 is a diagram showing an arrangement of electrodes of a first liquid crystal cell, a second liquid crystal cell, a third liquid crystal cell, and a fourth liquid crystal cell that configure a liquid crystal light control element according to an embodiment of the present invention.

FIG. 3 shows a perspective view of an arrangement of electrodes in each of the first liquid crystal cell 10, the second liquid crystal cell 20, the third liquid crystal cell 30, and the fourth liquid crystal cell 40.

The first liquid crystal cell 10 includes the first substrate S11 and the second substrate S12, and a first liquid crystal layer LC1 between the first substrate S11 and the second substrate S12. The first substrate S11 has a first electrode E11 on a side facing the first liquid crystal layer LC1, and the second substrate S12 has a second electrode E12 on a side facing the first liquid crystal layer LC1. The first electrode E11 and the second electrode E12 are arranged so as to face each other across the first liquid crystal layer LC1. As described above, the first substrate S11 and the second substrate S12 are facing each other, and the facing surface can be defined as the inner surface, and a surface opposite to the inner surface can be defined as the outer surface. In this case, the first electrode E11 is arranged on the inner surface of the first substrate and the second electrode E12 is arranged on the inner surface of the second substrate.

The first electrode E11 includes a plurality of first strip electrodes E11A and a plurality of second strip electrodes E11B formed in a strip shape. The second electrode E12 includes a plurality of third strip electrodes E12A and a plurality of fourth strip electrodes E12B formed in a strip shape. The plurality of first strip electrodes 11A and the plurality of second strip electrodes E11B are arranged alternately, and the plurality of third strip electrodes 12A and the plurality of fourth strip electrodes E12B are arranged alternately.

FIG. 3 shows X, Y and Z-axis directions for the purposes of explanation. The first liquid crystal cell 10, the second liquid crystal cell 20, the third liquid crystal cell 30, and the fourth liquid crystal cell 40 are arranged overlaid in the Z-axis direction. The plurality of first strip electrodes E11A and the plurality of second strip electrodes E11B of the first liquid crystal cell 10 are arranged in a longitudinal direction parallel to the Y-axis direction, and the plurality of third strip electrodes 12A and the plurality of fourth strip electrodes E12B are arranged in a longitudinal direction parallel to the X-axis direction. That is, the plurality of first strip electrodes E11A and the plurality of second strip electrodes E11B and the plurality of third strip electrodes E12A and the plurality of fourth strip electrodes E12B are arranged to intersect. The longitudinal directions of the plurality of first strip electrodes E11A and the plurality of second strip electrodes E11B and the longitudinal directions of the plurality of third strip electrodes E12A and the plurality of fourth strip electrodes E12B can be arranged so that they intersect, for example, within 90 degrees±10 degrees, preferably orthogonally (90 degrees). In this embodiment, these longitudinal directions are orthogonal to each other.

The second liquid crystal cell 20 includes the first substrate S21 and the second substrate S22, and a second liquid crystal layer LC2 between the first substrate S21 and the second substrate S22. A first electrode E21 is arranged on a side of the first substrate S21 facing the second liquid crystal layer LC2, and a second electrode E22 is arranged on a side of the second substrate S22 facing the second liquid crystal layer LC2. The first electrode E21 includes a plurality of first strip electrodes E21A and a plurality of second strip electrodes E21B formed in strip form, and the second electrode E22 includes a plurality of third strip electrodes E22A and a plurality of fourth strip electrodes E22B formed in strip form.

For the second liquid crystal cell 20, the plurality of first strip electrodes 21A and the plurality of second strip electrodes E21B are arranged alternately, and the plurality of third strip electrodes 22A and the plurality of fourth strip electrodes E22B are arranged alternately. For the second liquid crystal cell 20, the longitudinal direction of the plurality of first strip electrodes 21A and the plurality of second strip electrodes E21B are arranged in a direction parallel to the Y-axis direction, and the longitudinal direction of the plurality of third strip electrodes 22A and the plurality of fourth strip electrodes E22B are arranged in a direction parallel to the X-axis direction. That is, the plurality of first strip electrodes E21A and the plurality of second strip electrodes E21B and the plurality of third strip electrodes E22A and the plurality of fourth strip electrodes E22B are arranged to intersect. The longitudinal directions of the plurality of first strip electrodes E21A and the plurality of second strip electrodes E21B and the longitudinal directions of the plurality of third strip electrodes E22A and the plurality of fourth strip electrodes E22B can be arranged so that they intersect, for example, within 90 degrees±10 degrees, preferably orthogonally (90 degrees). In this embodiment, these longitudinal directions are orthogonal to each other.

The third liquid crystal cell 30 includes the first substrate S31 and the second substrate S32, and a third liquid crystal layer LC3 between the first substrate S31 and the second substrate S32. A first electrode E31 is arranged on a side of the first substrate S31 facing the third liquid crystal layer LC3, and a second electrode E32 is arranged on a side of the second substrate S22 facing the third liquid crystal layer LC3. The first electrode E31 includes a plurality of first strip electrodes E31A and a plurality of second strip electrodes E31B formed in a strip shape, and the second electrode E32 includes a plurality of third strip electrodes E32A and a plurality of fourth strip electrodes E32B formed in a strip shape.

For the third liquid crystal cell 30, the plurality of first strip electrodes 31A and the plurality of second strip electrodes E31B are arranged alternately, and the plurality of third strip electrodes 32A and the plurality of fourth strip electrodes E32B are arranged alternately. For the third liquid crystal cell 30, the longitudinal direction of the plurality of first strip electrodes 31A and the plurality of second strip electrodes E31B are arranged in a direction parallel to the X-axis direction, and the longitudinal direction of the plurality of third strip electrodes 32A and the plurality of fourth strip electrodes E32B are arranged in a direction parallel to the Y-axis direction. That is, the plurality of first strip electrodes E31A and the plurality of second strip electrodes E31B and the plurality of third strip electrodes E32A and the plurality of fourth strip electrodes E32B are arranged to intersect. The longitudinal directions of the plurality of first strip electrodes E31A and the plurality of second strip electrodes E31B and the longitudinal directions of the plurality of third strip electrodes E32A and the plurality of fourth strip electrodes E32B can be arranged so that they intersect, for example, within degrees±10 degrees, preferably orthogonally (90 degrees). In this embodiment, these longitudinal directions are orthogonal to each other.

The fourth liquid crystal cell 40 includes the first substrate S41 and the second substrate S42, and a fourth liquid crystal layer LC4 between the first substrate S41 and the second substrate S42. A first electrode E41 is arranged on a side of the first substrate S41 facing the fourth liquid crystal layer LC4, and a second electrode E42 is arranged on a side of the second substrate S42 facing the fourth liquid crystal layer LC4. The first electrode E41 includes a plurality of first strip electrodes E41A and a plurality of second strip electrodes E41B formed in a strip shape, and the second electrode E42 includes a plurality of third strip electrodes E42A and a plurality of fourth strip electrodes E42B formed in a strip shape. In this embodiment, their longitudinal directions are orthogonal to each other.

For the fourth liquid crystal cell 40, the plurality of first strip electrodes 41A and the plurality of second strip electrodes E41B are arranged alternately, and the plurality of third strip electrodes 42A and the plurality of fourth strip electrodes E42B are arranged alternately. For the fourth liquid crystal cell 40, the longitudinal direction of the plurality of first strip electrodes 41A and the plurality of second strip electrodes E41B are arranged parallel to the X-axis direction, and the longitudinal direction of the plurality of third strip electrodes 42A and the plurality of fourth strip electrodes E42B are arranged parallel to the Y-axis direction. That is, the plurality of first strip electrodes E41A and the plurality of second strip electrodes E41B and the plurality of third strip electrodes E42A and the plurality of fourth strip electrodes E42B are arranged to intersect. The longitudinal directions of the plurality of first strip electrodes E41A and the plurality of second strip electrodes E41B and the longitudinal directions of the plurality of third strip electrodes E42A and the plurality of fourth strip electrodes E42B can be arranged so that they intersect, for example, within 90 degrees±degrees, preferably orthogonally (90 degrees). In this embodiment, these longitudinal directions are orthogonal to each other.

As is clear from the above description, the liquid crystal light control element 102 is arranged in the same longitudinal direction as the first strip electrode E11A and the second strip electrode E11B of the first liquid crystal cell and the first strip electrode E21A and the second strip electrode E21B of the second liquid crystal cell 20, the first strip electrode E31A and the second strip electrode E31B of the third liquid crystal cell 30 and the first strip electrode E41A and the second strip electrode E41B of the fourth liquid crystal cell 40 are arranged in the same direction in the longitudinal direction. The first strip electrode E11A and the second strip electrode E11B of the first liquid crystal cell and the first strip electrode E21A and the second strip electrode E21B of the second liquid crystal cell 20, and the first strip electrode E31A and the second strip electrode E31B of the third liquid crystal cell 30 and the first strip electrode E41A and the second strip electrode E41B of the fourth liquid crystal cell 40 are arranged so that their longitudinal directions intersect. In this embodiment, the intersecting angle is 90 degrees.

Similarly, the liquid crystal light control element 102 is arranged in the same longitudinal direction as the third strip electrode E12A and the fourth strip electrode E12B of the first liquid crystal cell 10, the third strip electrode E22A and the fourth strip electrode E22B of the second liquid crystal cell 20, the third strip electrode E32A and the fourth strip electrode E32B of the third liquid crystal cell 30 and the third strip electrode E42A and the fourth strip electrode E42B of the fourth liquid crystal cell 40 are arranged in the same longitudinal direction. The third strip electrode E12A and the fourth strip electrode E12B of the first liquid crystal cell 10 and the third strip electrode E22A and the fourth strip electrode E22B of the second liquid crystal cell 20, and the third strip electrode E32A and the fourth strip electrode E32B of the third liquid crystal cell 30 and the third strip electrode E42A and the fourth strip electrode E42B of the fourth liquid crystal cell 40 are arranged so that their longitudinal directions intersect. The intersecting angle is preferably in the range of 90 degrees±10 degrees, and it is more preferable that the angles are orthogonal (90 degrees). In this embodiment, the intersecting angle is 90 degrees.

That is, the longitudinal direction of the strip patterns of the first electrodes E11, E21 of the first liquid crystal cell 10 and the second liquid crystal cell 20 is parallel to the Y-axis direction, and the longitudinal direction of the strip patterns of the first electrodes E31, E41 of the third liquid crystal cell 30 and the fourth liquid crystal cell 40 is parallel to the X-axis direction. In other words, the longitudinal direction of the strip patterns of the first electrodes E11, E21 of the first liquid crystal cell 10 and the second liquid crystal cell 20, and the longitudinal direction of the strip patterns of the first electrodes E31, E41 of the third liquid crystal cell 30 and the fourth liquid crystal cell 40 are arranged to intersect. The intersecting angle should be in the range of 90 degrees±10 degrees, as described above, and it is more preferable that the angles are orthogonal (90 degrees). In this embodiment, the intersecting angle is 90 degrees.

The first electrode E11 and second electrode E12 in the first liquid crystal cell 10, the first electrode E21 and second electrode E22 in the second liquid crystal cell 20, the first electrode E31 and second electrode E32 in the third liquid crystal cell 30, and the first electrode E41 and second electrode E42 in the fourth liquid crystal cell 40 have the same size in a plan view. Although not shown in FIG. 3, the light source unit (106) is arranged on the lower side of the first liquid crystal cell 10. Light emitted from the light source unit (106) and incident on the liquid crystal light control element 102 passes through the first liquid crystal cell 10, the second liquid crystal cell 20, the third liquid crystal cell 30, and the fourth liquid crystal cell 40 and is emitted.

Since the first liquid crystal cell 10, second liquid crystal cell 20, third liquid crystal cell 30, and fourth liquid crystal cell 40 have substantially similar configurations, the first liquid crystal cell 10 will be described more specifically below on behalf of these liquid crystal cells.

Figure 4A:
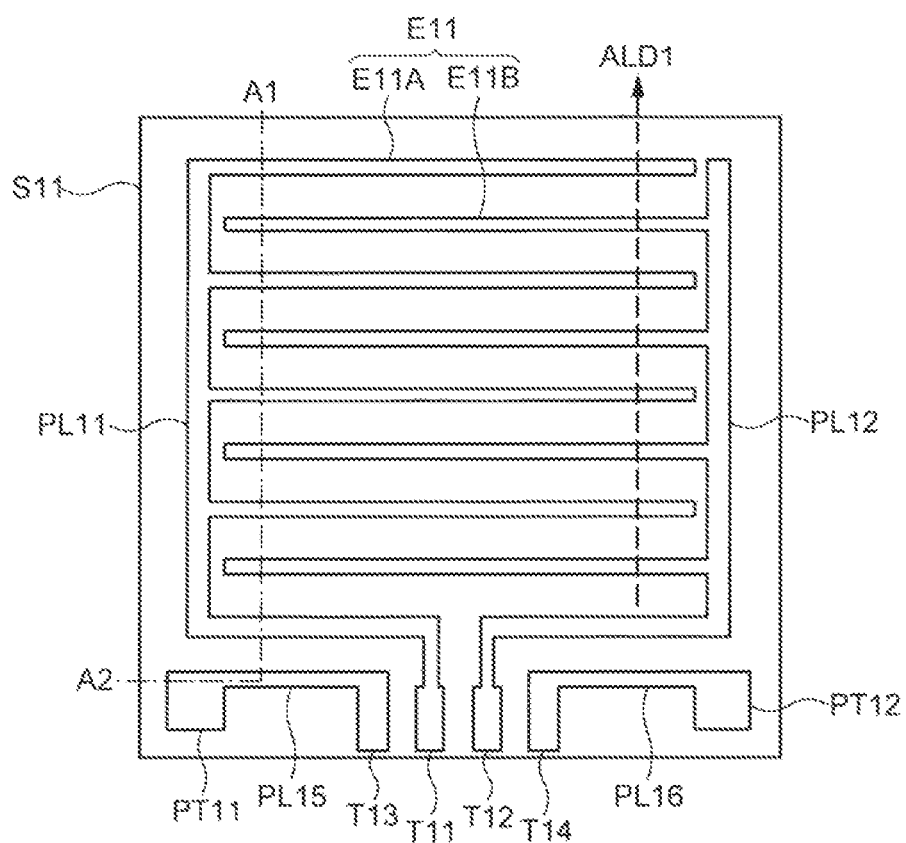
FIG. 4A is a plan view of electrodes on a first substrate of a liquid crystal cell configured with a liquid crystal light control element according to an embodiment of the present invention.
Figure 4B:
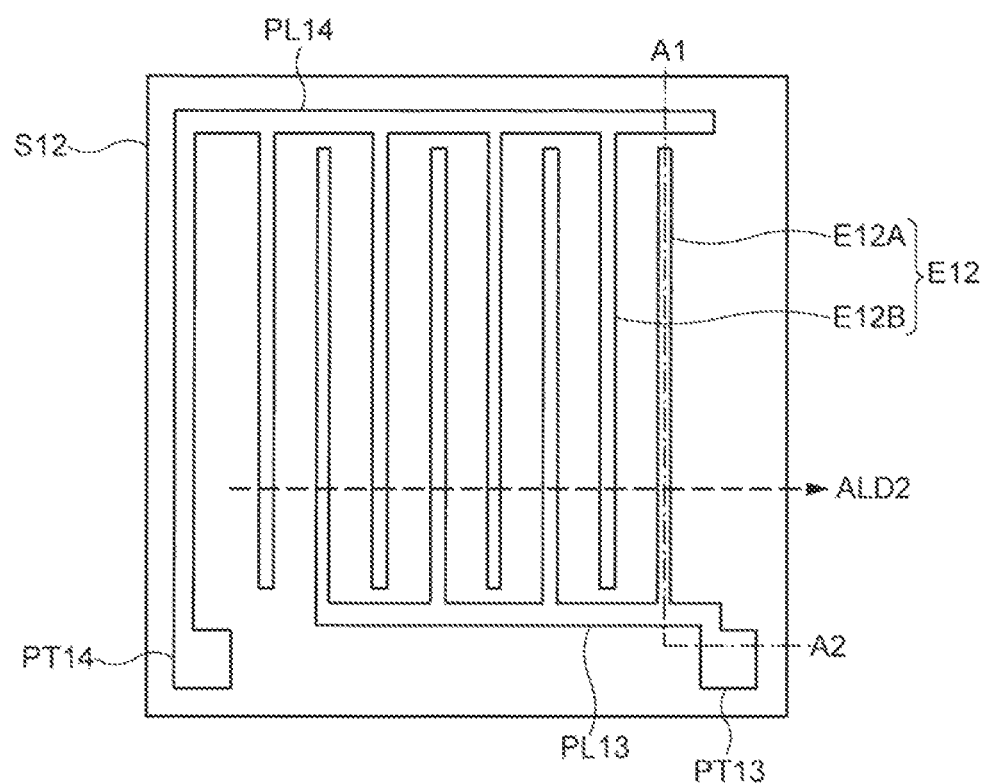
FIG. 4B is a plan view of electrodes on a second substrate of a liquid crystal cell configured with a liquid crystal light control element according to an embodiment of the present invention.

FIG. 4A shows a plan view of the first substrate S11, and FIG. 4B shows a plan view of the second substrate S12. FIG. 4B is a plan view of the second substrate S12 from the inside surface.

As shown in FIG. 4A, the first electrode E11 is arranged on the first substrate S11. The first electrode E11 includes the plurality of first strip electrodes E11A and the plurality of second strip electrodes E11B. The plurality of first strip electrodes E11A and the plurality of second strip electrodes E11B have a strip pattern. The strip pattern of the plurality of first strip electrodes E11A and the strip pattern of the plurality of second strip electrodes E11B are arranged alternately in a direction intersecting the longitudinal direction and separated by a predetermined interval.

The plurality of first strip electrodes E11A are each connected to the first power supply line PL11, and the plurality of second strip electrodes E11B are each connected to the second power supply line PL12. The first power supply line PL11 is connected to a first connection terminal T11, and the second power supply line PL12 is connected to a second connection terminal T12. The first connection terminal T11 and the second connection terminal T12 are arranged along one of the edges of the first substrate S11. A third connection terminal T13 is arranged adjacent to the first connection terminal T11 and a fourth connection terminal T14 is arranged adjacent to the second connection terminal T12 on the first substrate S11. The third connection terminal T13 is connected to a fifth power supply line PL15. The fifth power supply line PL15 is connected to a first power supply terminal PT11 arranged at a predetermined position in the plane of the first substrate S11. The fourth connection terminal T14 is connected to a sixth power supply line PL16. The sixth power supply line PL16 is connected to a second power supply terminal PT12 arranged at a predetermined location in the plane of the first substrate S11.

The plurality of first strip electrodes E11A are connected to the first power supply line PL11 to apply the same voltage. The plurality of second strip electrodes E11B are connected to the second power supply line PL12 to apply the same voltage. As shown in FIG. 4A, the plurality of first strip electrodes E11A and the plurality of second strip electrodes E11B are arranged alternately. The plurality of first strip electrodes E11A and the plurality of second strip electrodes E11B are electrically separated. When different levels of voltage are applied to the plurality of first strip electrodes E11A and the plurality of second strip electrodes E11B, an electric field is generated between the two electrodes due to the potential difference. That is, a transverse electric field can be generated by the plurality of first strip electrodes E11A and the plurality of second strip electrodes E11B.

As shown in FIG. 4B, the second electrode E12 is arranged on the second substrate S12. The second electrode E12 includes the plurality of third strip electrodes E12A and the plurality of fourth strip electrodes E12B. The plurality of third strip electrodes E12A and the plurality of fourth strip electrodes E12B have a strip pattern. The strip pattern of the plurality of third strip electrodes E12A and the strip pattern of the plurality of fourth strip electrodes E12B are arranged alternately in a direction intersecting the longitudinal direction and separated by a predetermined interval.

The plurality of third strip electrodes E12A are each connected to the third power supply line PL13, and the plurality of fourth strip electrodes E12B are each connected to the fourth power supply line PL14. The third power supply line PL13 is connected to a third power supply terminal PT13, and the fourth power supply line PL14 is connected to a fourth power supply terminal PT14. The third power feed terminal PT13 is arranged at a position corresponding to the first power feed terminal PT11 on the first substrate S11, and the fourth power feed terminal PT14 is arranged at a position corresponding to the second power feed terminal PT12 on the first substrate S11.

The plurality of third strip electrodes E12A are connected to the third power supply line PL13 to apply the same voltage. The plurality of fourth strip electrodes E12B are connected to the fourth power supply line PL14 to apply the same voltage. As shown in FIG. 4B, the plurality of third strip electrodes E12A and the plurality of fourth strip electrodes E12B are arranged alternately. The plurality of third strip electrodes E12A and the plurality of fourth strip electrodes E12B are electrically separated. When different levels of voltage are applied to the plurality of third strip electrodes E12A and the plurality of fourth strip electrodes E12B, an electric field is generated between the two electrodes due to the potential difference. That is, the transverse electric field can be generated by the plurality of third strip electrodes E12A and the plurality of fourth strip electrodes E12B.

The first connection terminal T11, the second connection terminal T12, the third connection terminal 13, and the fourth connection terminal T14 on the first substrate S11 are terminals that are connected to the flexible wiring substrate. For the first liquid crystal cell 10, the first supply terminal PT11 and the third power supply terminal PT13 are electrically connected by a conductive material, and the second supply terminal PT12 and the fourth supply terminal PT14 are electrically connected to the conductive material.

Figure 5:
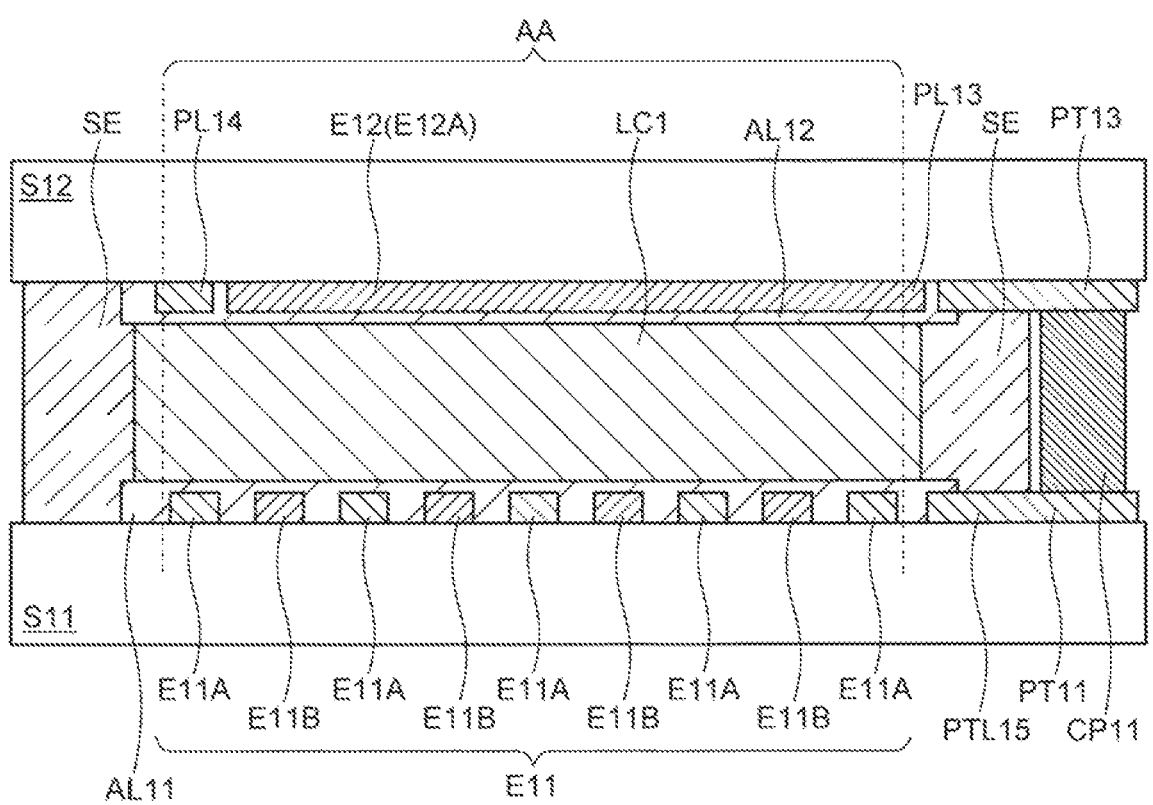
FIG. 5 is an example of a cross-sectional structure of a liquid crystal cell configured with a liquid crystal light control element according to an embodiment of the present invention.

FIG. 5 shows a cross-sectional view of the first liquid crystal cell 10. The cross-sectional structure of the first liquid crystal cell 10 shown in FIG. 5 corresponds to the line A1-A2 of the first substrate S11 shown in FIG. 4A and the second substrate S12 shown in FIG. 4B.

The first liquid crystal cell 10 has an effective area AA capable of polarizing and scattering incident light. The first electrode E11 and the second electrode E12 are arranged in the effective area AA. The first substrate S11 and the second substrate S12 are bonded by a sealant SE arranged outside the effective area AA. A gap is formed between the first substrate S11 and the second substrate S12 to seal the first liquid crystal layer LC1. The first liquid crystal layer LC1 is sealed between the first substrate S11 and the second substrate S12 by the sealant SE.

The first substrate S11 has a structure with the first electrode E11, the first power supply terminal PT11, and the first alignment film AL11 on the first electrode E11. The first electrode E11 includes the first strip electrode E11A and the second strip electrode E11B. The first power supply terminal PT11 has a structure continuous from the fifth power supply line PL15 and is arranged outside the sealant SE.

The second substrate S12 has the second electrode E12, the third power supply terminal PT13, and the second alignment film AL12 on the second electrode E12. The second electrode E12 includes the third strip electrode E12A and the fourth strip electrode E12B. The third power supply terminal PT13 has a structure continuous from the third power supply line PL13 and is arranged outside the sealant SE.

The first electrode E11 and the second electrode E12 are arranged so that the longitudinal directions of the strip electrode patterns intersect. That is, the longitudinal directions of the first strip electrode E11A and the second strip electrode E11B are arranged so that the longitudinal directions of the third strip electrode E12A and the fourth strip electrode E12B intersect. The first strip electrode E11A and the second strip electrode E11B intersect the third strip electrode E12A and the fourth strip electrode E12B at an angle of 90 degrees in this example. The intersecting angle between the first electrode E11 and the second electrode E12 can be set at 90 degrees±10 degrees, for example, as described above.

The first power supply terminal PT11 and the third power supply terminal PT13 are arranged opposite each other in the outer region of the sealant SE. A first conductive member CP11 is arranged between the first power supply terminal PT11 and the third power supply terminal PT13 to electrically connect the two terminals. The first conductive member CP11 can be formed with a conductive paste material, for example, silver paste or carbon paste. Although not shown in FIG. 5, the second power supply terminal PT12 and the fourth power supply terminal PT14 are also electrically connected by conductive members in the same way.

The first substrate S11 and the second substrate S12 are transparent substrates, for example, glass substrate or resin substrate. The first electrode E11 and second electrode E12 are transparent electrodes formed by a transparent conductive material such as indium tin oxide (ITO) or indium zinc oxide (IZO). The power supply lines (first power supply line PL11, second power supply line PL12, third power supply line PL13, fourth power supply line PL14, fifth power supply line PL15, sixth power supply line PL16), the connection terminals (first connection terminal T11, second connection terminal T12, third connection terminal T13, fourth connection terminal T14) and the power supply terminals (first power supply terminal PT11, second power supply terminal PT12, third power supply terminal PT13, and fourth power supply terminal PT14) are formed by metallic materials such as aluminum, titanium, molybdenum, and tungsten. The power supply lines (first power supply line PL11, second power supply line PL12, third power supply line PL13, fourth power supply line PL14, fifth power supply line PL15, sixth power supply line PL16) may be formed of the same transparent conducting film as the first electrode E11 and second electrode E12. The alignment films AL1, AL2 are formed by horizontally oriented films having an orientation regulating force that is parallel to the primary plane of the substrate. The first liquid crystal layer LC1 is, for example, a twisted nematic liquid crystal (TN (Twisted Nematic) liquid crystal). Although not shown in FIG. 5, spacers may be arranged between the first substrate S11 and the second substrate S12 to keep the distance between the two substrates constant.

Next, with reference to FIG. 6A, FIG. 6B, FIG. 6C, FIG. 7A, FIG. 7B, FIG. 7C, and FIG. 8, the electro-optical effects in the first liquid crystal cell 10 are explained. Only those configurations necessary for explanation are represented in FIG. 6A to FIG. 8.

Figure 6A:
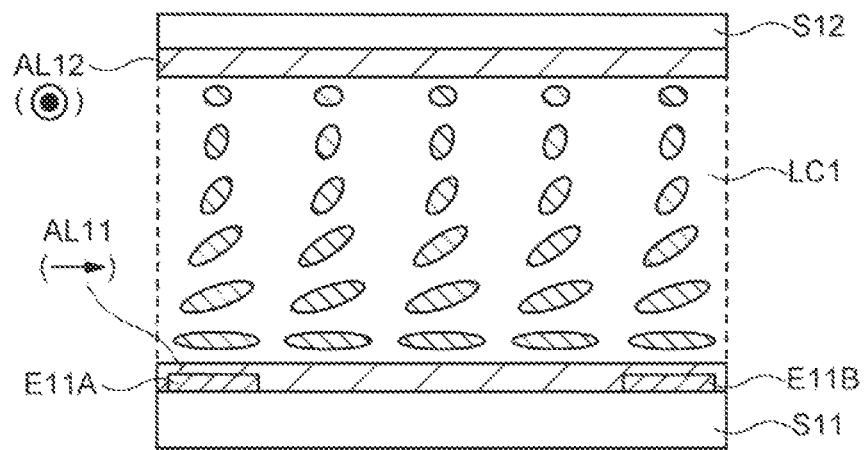
FIG. 6A is an illustration of an operation of a liquid crystal cell configured with a liquid crystal light control element according to an embodiment of the present invention, and shows an orientation state of liquid crystal molecules in a state where voltage is not applied.
Figure 6B:
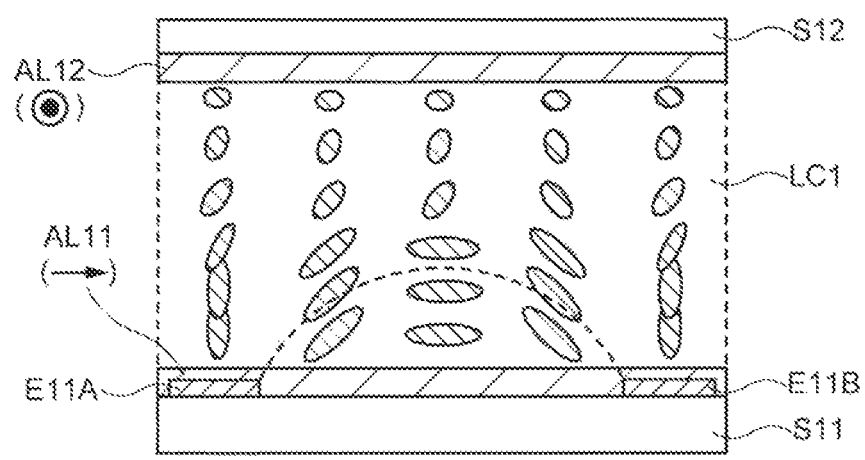
FIG. 6B is an illustration of an operation of a liquid crystal cell configured with a liquid crystal light control element according to an embodiment of the present invention, and shows an orientation state of the liquid crystal molecules in a state where voltage is applied.

FIG. 6A shows a partial cross-sectional schematic structure of the first liquid crystal cell 10. FIG. 6B shows the first strip electrode E11A, the second strip electrode E11B, the first alignment film AL11 on the first substrate S11, and the second alignment film AL12 on the second substrate S12, and the first liquid crystal layer LC1. In FIG. 6A, the third strip electrode E12A and the fourth strip electrode E12B are omitted to simplify the explanation.

FIG. 6A shows that the alignment processing direction of the first alignment film AL11 is different from that of the second alignment film AL12. Specifically, the first alignment film AL11 has an alignment processed in the direction ALD1, which intersects the longitudinal direction of the first strip electrode E11A and the second strip electrode E11B at an angle of 90 degrees, as shown in FIG. 4A, and the second alignment film AL12 has an alignment processed in the direction ALD2, which intersects the longitudinal direction of the third strip electrode E12A and the fourth strip electrode E12B at an angle of degrees, as shown in FIG. 4B. Therefore, the first liquid crystal cell 10 shown in FIG. 6A has the first alignment film AL11 aligned in the left-right direction of the surface of the sheet, and the second alignment film AL12 aligned in the normal direction of the surface of the sheet. The alignment treatment may be a rubbing treatment or a light distribution treatment. The alignment direction of the alignment film can be set within a range of 90 degrees±10 degrees to the extending direction of the strip electrode.

TN liquid crystals are used as the first liquid crystal layer LC1. Since the alignment direction ALD1 of the first alignment film AL11 and the alignment direction ALD2 of the second alignment film AL12 are orthogonal, the liquid crystal molecules in the first liquid crystal layer LC1 are aligned from the first alignment film AL11 to the second alignment film AL12 with the long axis direction of the liquid crystal molecules twisted 90 degrees in the absence of an external electric field. FIG. 6A shows the state in which voltage is not applied to the first strip electrode E11A and the second strip electrode E11B, and the long axis direction of the liquid crystal molecules is aligned twisted by 90 degrees.

FIG. 6A shows an example where the liquid crystal layer LC1 is formed by positive type twisted nematic liquid crystal (TN liquid crystal) and the long axis of the liquid crystal molecules is aligned in the same direction as the alignment direction of the alignment film, but the alignment direction of the alignment film is rotated 90 degrees. That is, it is possible to use negative liquid crystals by aligning the orientation direction of each alignment film AL11 and AL12 with the extending direction of the strip electrodes E11A and E12A of each substrate S11, S12. The liquid crystal should contain a chiral agent that imparts twist to the liquid crystal molecules.

FIG. 6B shows a state in which a low-level voltage VL is applied to the first strip electrode E11A and a high-level voltage VH is applied to the second strip electrode E11B. In this state, the transverse electric field is generated between the first strip electrode E11A and the second strip electrode E11B. As shown in FIG. 6B, the liquid crystal molecules closer to the first substrate S11 change their alignment direction under the influence of the transverse electric field. For example, the alignment of the liquid crystal molecules closer to the first substrate S11 changes so that the long axis direction is parallel to the direction of the electric field.

Figure 6C:
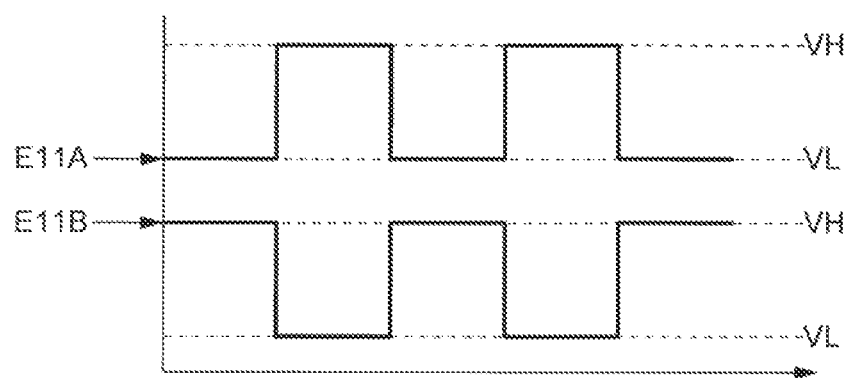
FIG. 6C is a diagram illustrating an operation of a liquid crystal cell configured with a liquid crystal light control element according to an embodiment of the present invention, and shows waveforms of control signals applied to the electrodes that drive the liquid crystal.

The voltages of the low-level voltage VL and the high-level voltage VH applied to the first strip electrode E11A and the second strip electrode E11B are set appropriately. For example, 0 V is applied as the low-level voltage VL1 and 5 to 30 V as the high-level voltage VH1. Voltages that alternate between the low-level voltage VL and the high-level voltage VH are applied to the first strip electrode E11A and the second strip electrode E11B. For example, as shown in FIG. 6C, in a certain period of time, the low-level voltage VL is applied to the first strip electrode E11A and the high-level voltage VH is applied to the second strip electrode E11B, and in the next period of time, the high-level voltage VH is applied to the first strip electrode E11A and the low-level voltage VL is applied to the second strip electrode E11B, so that the voltage-levels between the two electrodes are synchronized and change periodically.

An alternating electric field is generated in the first liquid crystal layer LC1 to suppress degradation, by alternately applying a low-level voltage VL and a high-level voltage VH to the first strip electrode E11A and the second strip electrode E11B. The frequency of the voltage applied to the first strip electrode E11A and the second strip electrode E11B should be a frequency at which the liquid crystal molecules can follow the change in the electric field, for example, to 100 Hz.

Figure 7A:
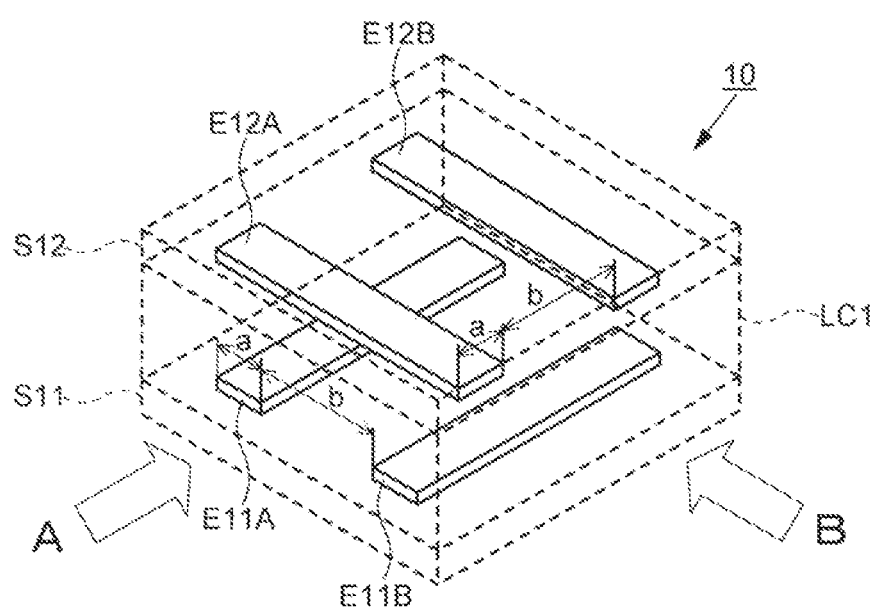
FIG. 7A is an illustration of an operation of a liquid crystal cell configured with a liquid crystal light control element according to an embodiment of the present invention, and shows a diagram of the arrangement of a first electrode and a second electrode.
Figure 7B:
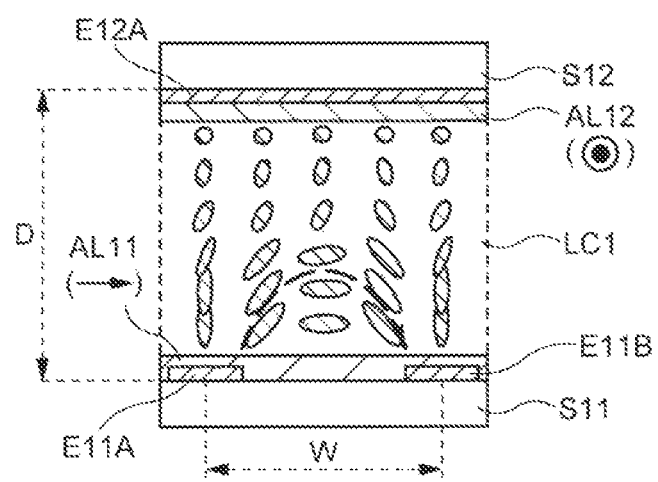
FIG. 7B is an illustration of an operation of a liquid crystal cell configured with a liquid crystal light control element according to an embodiment of the present invention, and shows an orientation state of the liquid crystal molecules when a voltage is applied to the first electrode.
Figure 7C:
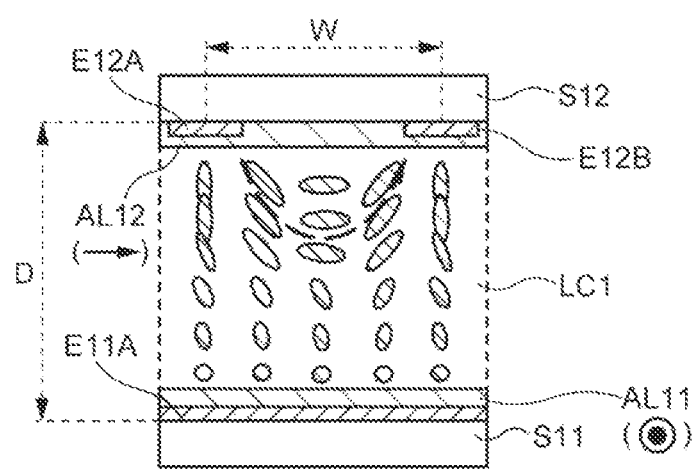
FIG. 7C is an illustration of an operation of a liquid crystal cell configured with a liquid crystal light control element according to an embodiment of the present invention, and shows an orientation state of the liquid crystal molecules when a voltage is applied to the second electrode.

FIG. 7A is a partial perspective view of the first liquid crystal cell 10, showing the arrangement of the first strip electrode E11A and the second strip electrode E11B, the third strip electrode E12A and the fourth strip electrode E12B, and the first liquid crystal layer LC1. FIG. 7B and FIG. 7C show cross-sectional schematic views of the first liquid crystal cell 10. FIG. 7B shows a cross-sectional schematic diagram of the first liquid crystal cell 10 from side A shown in FIG. 7A, and FIG. 7C shows a cross-sectional schematic diagram from side B shown in the figure. FIG. 7B and FIG. 7C show that the alignment treatment direction of the first alignment film AL11 is different from that of the second alignment film AL12.

As shown in FIG. 7A and FIG. 7C, the first strip electrode E11A and the second strip electrode E11B are arranged at a center-to-center distance W, and the third strip electrode E12A and the fourth strip electrode E12B are also arranged at a center-to-center distance W. This center-to-center distance W has the relationship W=a+b with respect to the width a of the first strip electrode E11A shown in FIG. 7A and the distance b from the edge of the first strip electrode E11A to the edge of the second strip electrode E11B. The first strip electrode E11A and the second strip electrode E11B and the third strip electrode E12A and the fourth strip electrode E12B are arranged facing each other at a distance and orthogonally to each other. The first substrate S11 and the second substrate S12 are arranged facing each other at a spacing D, and the distance D corresponds substantially to the thickness of the liquid crystal layer LC1.

In practice, the first strip electrode E11A and the first alignment film AL11 are arranged on the first substrate S11, and the third strip electrode E12A and the second alignment film AL12 are arranged on the second substrate S12, since the thickness of these electrodes and alignment films is sufficiently small compared to the distance D, the thickness of the liquid crystal layer LC1 can be viewed as the same as the distance D.

In the first liquid crystal cell 10, the distance D between the strip electrodes facing each other via the first liquid crystal layer LC1 should be the same or larger than the center-to-center distance W of the strip electrodes. In other words, it is preferable that the distance D has a length that is one or more times longer than the center-to-center distance W. For example, it is preferable that the distance D is at least twice as large as the center-to-center distance W of the strip electrodes. When the width of the first strip electrode E11A is 5 μm, the width "a" of the first strip electrode E11A and the second strip electrode E11B is 5 μm, the distance b from the edge of the first strip electrode E11A to the edge of the second strip electrode E11B is 5 μm, and the center-to-center distance W of the strip electrodes is 10 μm. In contrast, it is preferable that the distance D is larger than 10 μm.

Due to having such a relationship between the center-to-center distance W of the strip electrodes and the above distance D, it is possible to prevent the electric field generated by the first strip electrode E11A and the second strip electrode E11B and the electric field generated by the third strip electrode E12A and the fourth strip electrode E12B from interfering with each other. That is, it is possible to control the alignment of the liquid crystal molecules in the vicinity by the first strip electrode E11A and the second strip electrode E11B without the influence of the third strip electrode E12A and the fourth strip electrode E12B, as shown in FIG. 7B, and it is possible to control the alignment of the liquid crystal molecules in the vicinity by the third strip electrode E12A and the fourth strip electrode E12B, without the influence of the first strip electrode E11A and the second strip electrode E11B, as shown in FIG. 7C.

It is known, by the way, that the refractive index of liquid crystals changes depending on their alignment state. As shown in FIG. 6A, in the off state in which no electric field is applied to the first liquid crystal layer LC1, the long axis direction of the liquid crystal molecules is aligned horizontally on the substrate surface and twisted 90 degrees from the first substrate S11 side to the second substrate S12 side. The liquid crystal layer LC1 has an almost uniform refractive index distribution in this alignment state. Therefore, a first polarized component PL1 and a second polarized component PL2 orthogonal to the first polarized component PL1 (refer to FIG. 8) included in incident light into the first liquid crystal cell 10 are affected by the initial alignment of the liquid crystal molecules and make optical rotation, but almost without being refracted (or scattered), and pass through the first liquid crystal layer LC1. Here, the first polarized component PL1 corresponds to, for example, p-polarized natural light, and the second polarized component corresponds to, for example, s-polarized natural light.

On the other hand, as shown in FIG. 6B, in the on (ON) state in which a voltage is applied to the first strip electrode E11A and the second strip electrode E11B and an electric field is formed, when the first liquid crystal layer LC1 has positive dielectric anisotropy, the liquid crystal molecules are aligned so that their long axis follows the electric field. As a result, as shown in FIG. 6B, the first liquid crystal layer LC1 is formed in a region where the liquid crystal molecules stand up almost vertically above the first strip electrode E11A and the second strip electrode E11B, a region where the liquid crystal molecules are oriented diagonally along the distribution of electric field between the first strip electrode E11A and the second strip electrode E11B, and a region in which the initial alignment state is relatively maintained is formed in the region away from the first strip electrode E11A and the second strip electrode E11B.

As shown in FIG. 6B, the long axis of the liquid crystal molecules is aligned in a convex arc along the direction in which the electric field occurs between the electrodes of the first strip electrode E11A and the second strip electrode E11B. That is, as shown in FIG. 6A and FIG. 6B, the direction of the initial alignment of the liquid crystal molecules and the direction of the transverse electric field generated between the first strip electrode E11A and the second strip electrode E11B are the same, as shown schematically in FIG. 6B, the direction of alignment of the liquid crystal molecules located in the center between the two electrodes changes little, however, the liquid crystal molecules located from the center to both electrodes are aligned in a direction normal to the surface of the first substrate S11 (tilted) according to the intensity distribution of the electric field. Therefore, looking at the liquid crystal closer to the first substrate S11, the liquid crystal molecules are aligned in a circular arc between the first strip electrode E11A and the second strip electrode E11B.

As a result, the liquid crystal layer LC1 forms an arc-shaped dielectric constant distribution, and the incident light (polarized component parallel to the direction of the initial alignment of the liquid crystal molecules) is diffused radially. On the second substrate S12 side, the third strip electrode E12Aa and the fourth strip electrode E12B arranged orthogonally to the electrode of the first substrate S11 (refer to FIG. 7C) cause the same phenomenon, and the incident light (polarized component parallel to the direction of the initial alignment of liquid crystal molecules on the second substrate S12 side) is diffused radially.

In addition, as explained with reference to FIG. 7B and FIG. 7C, it is possible to control the diffusion of different polarized components independently on the first substrate S11 side and the second substrate S12 side because the thickness of the liquid crystal layer LC1 is sufficiently thick.

Liquid crystal molecules have a refractive index anisotropy Δn. Therefore, the first liquid crystal layer LC1 in the on state has a refractive index distribution or retardation distribution according to the alignment state of the liquid crystal molecules. The retardation is expressed as $\Delta n \cdot d$ when the thickness of the first liquid crystal layer LC1 is d. In the on state, the first polarized component PL1 is scattered by the refractive index distribution of the first liquid crystal layer LC1 when it passes through the first liquid crystal layer LC1.

Figure 8:
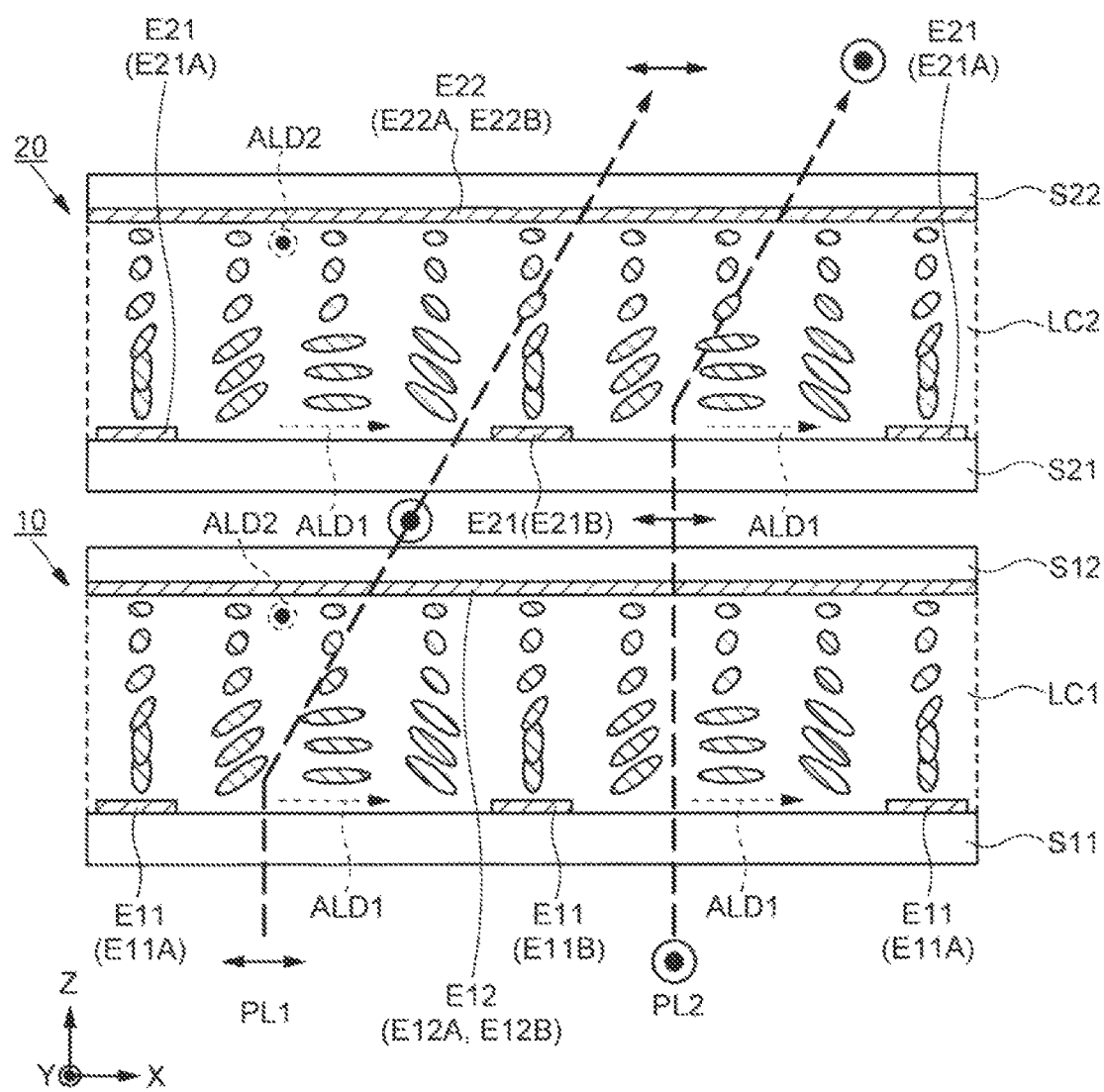
FIG. 8 is a schematic diagram of a phenomenon in which a first polarized component and a second polarized component are diffused by two liquid crystal cells.

FIG. 8 schematically shows the phenomenon of diffusion of the first polarized component PL1 and the second polarized component PL2 by the liquid crystal layers. FIG. 8 shows the first liquid crystal cell 10 and the second liquid crystal cell 20 stacked, and for simplicity, only showing the first substrate S11, S21, second substrate S12, S22, first strip electrodes E11A, E21A and second strip electrodes E11B, E21B, first liquid crystal layer LC1, and second liquid crystal layer LC2. For example, the first transparent adhesive layer TA1 arranged between the first liquid crystal cell 10 and the second liquid crystal cell 20 is omitted. The first strip electrode E11A and the second strip electrode E11B of the first liquid crystal cell 10 and the first strip electrode E21A and the second strip electrode E21B of the second liquid crystal cell 20 shall be arranged in the same direction. The alignment direction ALD1 of the alignment film (not shown) of the first substrate S11 of the first liquid crystal cell 10 and the first substrate S21 of the second liquid crystal cell 20 is in the left-right direction of the surface of the sheet, the alignment direction ALD2 of the alignment films (not shown) of the second substrate S12 of the first liquid crystal cell 10 and the second substrate S22 of the second liquid crystal cell 20 is in the normal direction of the surface of the sheet.

In FIG. 8, the polarization direction of the first polarized component PL1 is parallel to the initial alignment direction of the liquid crystal molecules on the first substrate S11 side in the first liquid crystal layer LC1 included in the first liquid crystal cell 10 (the direction in which the long axis of the liquid crystal molecules are aligned under no electric field) and the initial alignment direction of the liquid crystal molecules on the first substrate S21 side in the second liquid crystal layer LC2 included in the second liquid crystal cell 20. And the polarization direction of the second polarized component PL2 and the alignment directions of the liquid crystal molecules of the first substrate S11 side of the first liquid crystal layer LC1 and the first substrate S21 side of the second liquid crystal layer LC2 is orthogonal.

When voltage is applied to the first strip electrode E11A and the second strip electrode E11B of the first liquid crystal cell 10, the liquid crystal molecules form regions that stand up vertically, regions that are oriented diagonally along the distribution of the electric field, and regions where the initial alignment state is maintained, in the first liquid crystal layer LC1. Similarly, when voltage is applied to the first strip electrode E21A and the second strip electrode E21B of the second liquid crystal cell 20, the liquid crystal molecules form regions that stand up vertically, regions that are oriented diagonally along the distribution of the electric field, and regions where the initial alignment state is maintained, in the second liquid crystal layer LC2.

The first polarized component PL1 is diffused in the first liquid crystal layer LC1 and optically rotated 90 degrees, and is not diffused in the second liquid crystal layer LC2 and optically rotated 90 degrees. The second polarized component PL2 is not diffused in the first liquid crystal layer LC1 and optically rotated 90 degrees, and is diffused in the second liquid crystal layer LC2 and optically rotated 90 degrees. That is, the first polarized component PL1 incident on the first substrate S11 is diffused by the first liquid crystal layer LC1 and is optically rotated by the first liquid crystal layer LC1 and the second liquid crystal layer LC2, respectively. The second polarized component PL2 incident on the first substrate S11 is diffused by the second liquid crystal layer LC2 and is optically rotated by the first liquid crystal layer LC1 and the second liquid crystal layer LC2, respectively. The term "optical rotation" refers to a phenomenon in which a linearly polarized component (e.g., the above-mentioned first polarized component PL1 and second polarized component PL2) rotates its polarization axis along the twisting alignment of the liquid crystal molecules in passing through the liquid crystal layer.

More details are shown in FIG. 8. The first electrode E11 and the second electrode E12 of the first liquid crystal cell 10 are orthogonal to each other, and the first electrode E21 and the second electrode E22 of the second liquid crystal cell 20 are orthogonal to each other. The direction of extension of the first electrode E11 in the first liquid crystal cell 10 and the direction of extension of the first electrode E21 in the second liquid crystal cell 20 coincide. The light containing the first polarized component PL1 (polarized component in the X-axis direction) and the second polarized component PL2 (polarized component in the Y-axis direction) enters the first liquid crystal cell 10 from a direction perpendicular to the first substrate S11 and exits from the second substrate S22 of the second liquid crystal cell 20.

Since the liquid crystal molecules in the liquid crystal layer LC1 on the first substrate S11 side of the first liquid crystal cell 10 are aligned with their long axis along the X-axis direction, when the transverse electric field is generated between the first strip electrode E11A and the second strip electrode E11B, as explained with reference to FIG. 7B, the liquid crystal molecules are affected by the electric field to form a convex arc in the X-axis direction. Since the liquid crystal molecules of the first liquid crystal layer LC1 on the second substrate S12 side of the first liquid crystal cell 10 are aligned with their long axis along the Y-axis direction, when the transverse electric field is generated between the third strip electrode E12A and the fourth strip electrode E12B (not shown), as explained with reference to FIG. 7C, the liquid crystal molecules are convex arc-like in the Y-axis direction. Due to the alignment of the liquid crystal molecules, a refractive index distribution dependent on the alignment of the liquid crystal molecules is formed on the first substrate S11 side and the second substrate S12 side.

The first polarized component PL1 parallel to the X-axis incident on the first liquid crystal cell 10 is rotated as it passes through the first liquid crystal layer LC1 and transitions to a polarized component parallel to the Y-axis on the second substrate S12 side. That is, the first polarized component PL1 has a polarization axis in the X-axis direction on the first substrate S11 side, but in the process of passing through the first liquid crystal layer LC1 in the thickness direction, the polarization axis gradually changes to have a polarization axis in the Y-axis direction on the second substrate S12 side and is emitted from the second substrate S12 side.

Since the polarized component PL1 incident on the first liquid crystal cell 10 from the substrate S11 side is parallel to the direction of alignment of the liquid crystal molecules of the first liquid crystal layer LC1 on the substrate S11 side, it diffuses in the X-axis direction according to the change in the refractive index distribution of the liquid crystal molecules. The first polarized component PL1 changes its polarization axis from the X-axis direction to the Y-axis direction by passing through the first liquid crystal layer LC1, thereby becoming parallel to the alignment direction of the liquid crystal molecules on the second substrate S12 side and diffusing in the Y-axis direction according to the change in refractive index distribution of the liquid crystal molecules concerned. That is, the first polarized component PL1, which is parallel to the X-axis direction before entering the first liquid crystal cell 10, changes its polarization axis from the X-axis direction to the Y-axis direction in the process of passing through the first liquid crystal cell 10, and also diffuses in the X-axis direction and Y-axis direction.

In contrast, the second polarized component PL2 entering the first liquid crystal cell 10 from the substrate S11 changes its polarization axis from the Y-axis direction to the X-axis direction under the effect of the first liquid crystal layer LC1 until it enters the first substrate S11 and is emitted from the second substrate S12. The second polarized component PL2 passes through the first substrate S11 side without diffusion because the polarization axis is orthogonal to the direction of alignment of the liquid crystal molecules in the first liquid crystal layer LC1 on the first substrate S11 side and is not affected by the refractive index distribution due to the liquid crystal molecules. The second polarized component PL2 is not affected by the refractive index distribution of the liquid crystal molecules and passes through without diffusion because the polarization axis of the first liquid crystal layer LC1 changes from the Y-axis direction to the X-axis direction, and its polarization axis on the second substrate S12 side is orthogonal to the alignment direction of liquid crystal molecules on the second substrate S12 side in the first liquid crystal layer LC1. That is, the second polarized component PL2 having a polarization axis in the Y-axis direction incident on the first liquid crystal cell 10 is emitted from the second substrate S12 without being diffused by the first liquid crystal layer LC1, although the polarization axis changes from the Y-axis direction to the X-axis direction in the process of passing through the first liquid crystal cell 10.

The second liquid crystal layer LC2 of the second liquid crystal cell 20 also has the same refractive index distribution as the first liquid crystal layer LC1 of the first liquid crystal cell 10. Therefore, the same phenomenon basically occurs in the second liquid crystal cell 20 as in the first liquid crystal cell 10. In contrast, since the polarization axes of the initial first polarized component PL1 and the second polarized component PL2 are swapped by passing through the first liquid crystal cell 10, the polarized components affected by the refractive index distribution in the second liquid crystal layer LC2 are also swapped. That is, in the process of passing through the second liquid crystal cell 20, the initial first polarized component PL1 changes its polarization axis from the Y-axis direction to the X-axis direction again, but no diffusion occurs. In contrast, the initial second polarized component PL2 changes its polarization axis from the X-axis direction to the Y-axis direction again, and is diffused under the influence of the refractive index distribution of the second liquid crystal layer LC2.

As is clear from the above, it is possible to change the polarization direction of light passing through these two liquid crystal cells twice by stacking two liquid crystal cells having the same structure, resulting in a state in which the polarization direction is the same before and after the incident and after the outgoing light. In contrast, the two liquid crystal cells can diffuse light transmitted through them by forming a convex arc-shaped refractive index distribution on the upper and lower sides of the liquid crystal layer due to the transverse electric field. Specifically, the first liquid crystal cell 10 can diffuse the light of the first polarized component PL1 in the X-axis direction, Y-axis direction, or both the X-axis direction and Y-axis direction, and the second liquid crystal cell 20 can diffuse the light of the second polarized component PL2 in the X-axis direction, Y-axis direction, or both the X-axis direction and Y-axis direction. That is, it is possible to diffuse light without changing the polarization state of light by stacking the first liquid crystal cell 10 and the second liquid crystal cell 20 and forming a refractive index distribution in the liquid crystal layer of each liquid crystal cell.

As described above, it is possible to change the polarization direction of the incident light twice by stacking two liquid crystal cells having the same structure, so that the polarization direction does not change before and after the light passes through the two liquid crystal cells. On the other hand, it is possible to refract light passing through in a specific direction by applying a transverse electric field to the liquid crystal layer to form the refractive index distribution. More specifically, the first liquid crystal cell 10 can diffuse light of the first polarized component PL1 in the X-axis direction, the Y-axis direction, or both the X-axis direction and Y-axis direction, and the second liquid crystal cell 20 can diffuse light of the second polarized component PL2 in the X-axis direction, the Y-axis direction, or both the X-axis direction and Y-axis direction.

As described above, for incident light passing through the first liquid crystal layer LC1 and the second liquid crystal layer LC2, the first polarized component PL1 is diffused by the first liquid crystal layer LC1 and the second polarized component PL2 is diffused by the second liquid crystal layer LC2. The incident light passing through the first liquid crystal layer LC1 and the second liquid crystal layer LC2 is optically rotated 90 degrees by the first liquid crystal layer LC1 and the second liquid crystal layer LC2, respectively. In other words, the incident light including the first polarized component PL1 and the second polarized component PL2 is diffused in the first liquid crystal cell 10 and the second polarized component PL2 is diffused in the second liquid crystal cell 20. That is, it is possible to control the scattering of specific polarized components separately by overlapping the first liquid crystal cell 10 and the second liquid crystal cell 20, thereby controlling the light distribution of light emitted from the light source.

Light is refracted at the boundary surfaces of different mediums, and it is known that the refraction angle varies depending on the wavelength of the light. When light is incident on a liquid crystal layer in which a refractive index distribution is formed, the refracting angle differs for each wavelength, and depending on the type of light source and the distance from the object to be irradiated, color breaks may be visible in the peripheral areas of the light distribution pattern formed by transmitting light to the liquid crystal light control element 102.

In contrast, as shown in FIG. 3, the liquid crystal light control element related to the present embodiment suppresses color breaking by overlapping four liquid crystal cells in the light path of the light source and arranging at least two of the four liquid crystal cells rotated by 90 degrees relative to the other liquid crystal cells. Specifically, the liquid crystal light control element 102 suppresses color breaking by arranging the electrodes with strip patterns so that their longitudinal directions face different directions in at least one set of adjacent and overlapping liquid crystal cells. The configuration is described in detail below based on the electrode configuration and operation of each liquid crystal cell.

Figure 9:
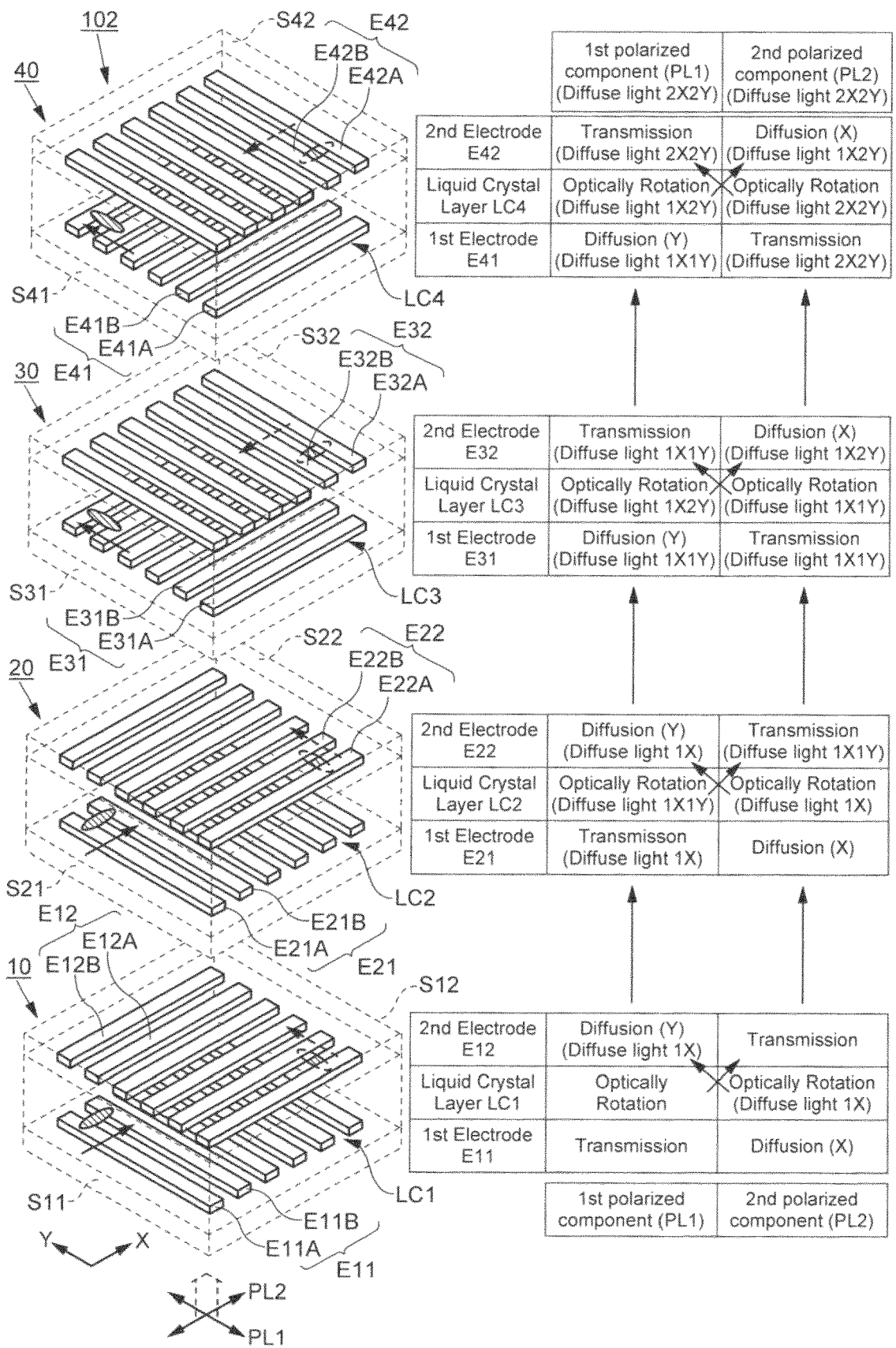
FIG. 9 is a diagram illustrating operation of a liquid crystal light control device according to an embodiment of the present invention.

FIG. 9 shows the arrangement of the strip electrodes in each liquid crystal cell of the liquid crystal light control element 102 and the mode in which the polarization state and scattering of the incident light are controlled by each liquid crystal cell. The arrangement of each electrode in the first liquid crystal cell 10, second liquid crystal cell 20, third liquid crystal cell 30, and fourth liquid crystal cell 40 is similar to the structure shown in FIG. 3. Specifically, the liquid crystal light control element 102 shown in FIG. 9 has the same alignment direction to the liquid crystal molecules in each substrate (S11, S12, S21, S22) of the first liquid crystal cell 10 and the second liquid crystal cell 20, the longitudinal directions of the strip electrodes (E11A, E11B, E21A, E21B) in the first electrodes E11, E21 are the same, and the longitudinal directions of the strip electrodes (E12A, E12B, E22A, E22B) at the second electrodes E12, E22, which intersect these electrodes, are the same. The alignment direction with respect to the liquid crystal molecules in each substrate (S31, S32, S41, S42) of the third and fourth liquid crystal cells 30 and 40 is the same, and the longitudinal direction of the strip electrodes (E31A, E31B, E41A, E41B) in the first electrodes E31, E41 is the same, and the longitudinal directions of the strip electrodes (E32A, E32B, E42A, E42B) at the second electrodes E32, E42, which intersect these electrodes, are the same. The longitudinal directions of the strip electrodes (E11A, E11B, E21A, E21B) in the first liquid crystal cell 10 and the second liquid crystal cell 20 intersect the longitudinal directions of the strip electrodes (E31A, E31B, E41A, E41B) in the first electrodes E31, E41 in the third liquid crystal cell 30 and the fourth liquid crystal cell 40 at an angle of 90 degrees.

In the embodiment shown in FIG. 9, the first liquid crystal cell 10 and the second liquid crystal cell 20 are stacked with the first electrodes E11, E21 facing in the same direction as each other, and the third liquid crystal cell 30 and the fourth liquid crystal cell 40 are stacked with the first electrodes E31, E41 facing in the same direction as each other, however, the orientation of the first electrodes E31, E41 of the third liquid crystal cell 30 and the fourth liquid crystal cell 40 are rotated 90 degrees with respect to the orientation of the first electrodes E11, E21 of the first liquid crystal cell 10 and the second liquid crystal cell 20. The first electrode (E11, E21, E31, E41) and the second electrode (E12, E22, E32, E42) of each liquid crystal cell are orthogonal to each other. The same is true for those embodiments shown in FIG. 12 to FIG. 14, which are described below. A configuration in which the third liquid crystal cell 30 and the fourth liquid crystal cell 40 are stacked with respect to the first liquid crystal cell and the second liquid crystal cell 20 in a rotated state within a range of 90 degrees±10 degrees can also be adopted. A configuration in which the direction of extension of the first electrode (E11, E21, E31, E41) and the second electrode (E12, E22, E32, E42) of each liquid crystal cell is set within a range of degrees±10 degrees can also be adopted.

As shown in FIG. 9, the second electrode E12 of the first liquid crystal cell 10 and the first electrode E41 of the fourth liquid crystal cell 40 are arranged in the same direction and can diffuse the second polarized component PL2 in the Y-axis direction. The first electrode E11 of the first liquid crystal cell 10 and the second electrode E42 of the fourth liquid crystal cell 40 are arranged in the same direction and can diffuse the second polarized component PL2 in the X-axis direction. The same is true for the diffusion of the first polarized component PL1, the second electrode E22 of the second liquid crystal cell 20 and the first electrode E31 of the third liquid crystal cell 30 are arranged in the same direction and can diffuse the first polarized component PL1 in the Y-axis direction, and the first electrode E21 of the second liquid crystal cell 20 and the second electrode E32 of the third liquid crystal cell 30 are arranged in the same direction and can diffuse the first polarized component PL1 in the X-axis direction.

The liquid crystal light control element 102 is arranged with the first liquid crystal cell 10, the second liquid crystal cell 20, the third liquid crystal cell 30, and the fourth liquid crystal cell 40 in this order from the light incident side. The light incident on the liquid crystal light control element 102 includes a first polarized component PL1 and a second polarized component PL2 orthogonal to the first polarized component PL1.

Figure 10A:
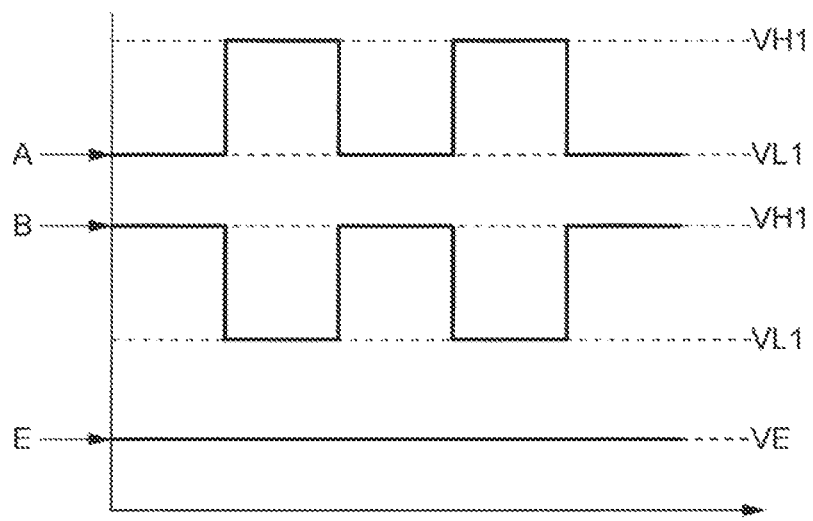
FIG. 10A is a voltage waveform applied to a liquid crystal cell in a liquid crystal light control device according to an embodiment of the present invention.

Control signals are input to each liquid crystal cell in order for the liquid crystal light control element 102 to control the polarization state and scattering state of the incident light. FIG. 10A shows an example of the waveform of the control signal applied to the electrodes of each liquid crystal cell. Each liquid crystal cell is input with one of the following signals: control signal A, control signal B, or control signal E shown in FIG. 10A. In the control signals A and B, VL1 means a low-level voltage and VH1 means a high-level voltage, for example, VL1 is a voltage of 0 V or −15 V, and VH1 is 30 V (relative to 0 V) or 15 V (relative to −15 V). The control signals A and B are synchronized, when the control signal A is at the level of VL1, the control signal B is at the level of VH1, and when the control signal A changes to the level of VH1, the control signal B changes to the level of VL1. The cycle of control signals A and B is about 15 to 100 Hz. The control signal E, on the other hand, is a constant voltage signal, for example, the control signal E is an intermediate voltage between VL1 and VH1, and VE=0V when VL1=−15V and VH1=+15V.

The following is an example of how the square-shaped light distribution pattern, cross-shaped light distribution pattern, and line-shaped light distribution pattern are formed by the liquid crystal light control element 102 according to such control signals.

(1) Square-Shaped Light Distribution Pattern

The liquid crystal light control device 100 can control various light distribution patterns of light emitted from the light source unit (106) by selecting control signals to be applied to each liquid crystal cell of the liquid crystal light control element 102. FIG. 9 shows, as an example, a case in which the light emitted from the light source (106) is controlled to a square-shaped light distribution pattern.

Table 1 shows the control signals applied to each liquid crystal cell in the liquid crystal light control element 102 shown in FIG. 9. The control signals A and B shown in Table 1 correspond to the control signals shown in FIG. 10A.

TABLE 1

| Liquid Crystal Light Control Element: 102 | | | | Control Signal |
|---|---|---|---|---|
| Fourth | Second | 2nd Electrode | 4th strip electrode: E42B | B |
| Liquid | Substrate | E42 | 3rd strip electrode: E42A | A |
| Crystal | First | 1st Electrode | 2nd strip electrode: E41B | B |

TABLE 1-continued

| Liquid Crystal Light Control Element: 102 | | | | Control Signal |
|---|---|---|---|---|
| Cell 40 | Substrate | E41 | 1st strip electrode: E41A | A |
| Third | Second | 2nd Electrode | 4th strip electrode: E32B | B |
| Liquid | Substrate | E32 | 3rd strip electrode: E32A | A |
| Crystal | First | 1st Electrode | 2nd strip electrode: E31B | B |
| Cell 30 | Substrate | E31 | 1st strip electrode: E31A | A |
| Second | Second | 2nd Electrode | 4th strip electrode: E22B | B |
| Liquid | Substrate | E22 | 3rd strip electrode: E22A | A |
| Crystal | First | 1st Electrode | 2nd strip electrode: E21B | B |
| Cell 20 | Substrate | E21 | 1st strip electrode: E21A | A |
| First | Second | 2nd Electrode | 4th strip electrode: E12B | B |
| Liquid | Substrate | E12 | 3rd strip electrode: E12A | A |
| Crystal | First | 1st Electrode | 2nd strip electrode: E11B | B |
| Cell 10 | Substrate | E11 | 1st strip electrode: E11A | A |

For the example shown in FIG. 9, the control signal A is input to the first strip electrode E11A, the control signal B is input to the second strip electrode E11B, the control signal A is input to the third strip electrode E12A, and the control signal B is input to the fourth strip electrode E12B, of the first liquid crystal cell 10. As shown in Table 1, the control signals A and B are input to the second liquid crystal cell 20, the third liquid crystal cell 30, and the fourth liquid crystal cell 40 in the same manner as for the first liquid crystal cell 10. That is, for the example shown in FIG. 9, the control signals A and B are alternately applied to all the electrodes arranged alternately on the respective substrates, and the electric field is generated between any of the electrodes.

The alignment direction defined by the alignment films formed on each substrate in FIG. 9 is orthogonal to the longitudinal direction of the strip electrodes, as indicated by the arrows in the figure. The liquid crystal layer is made of positive liquid crystals, and in the initial state when the control signal is not input to each liquid crystal cell, the long axis direction of the liquid crystal is aligned in the direction that intersects (orthogonally) with the strip electrode. The alignment direction of the alignment film is set in this embodiment at 90 degrees to the extending direction of the strip electrode, but can also be set at 90 degrees±10 degrees.

During operation of the liquid crystal light control element 102, the control signals shown in Table 1 are input to each strip electrode of each liquid crystal cell. When the control signals shown in Table 1 are input to the first liquid crystal cell 10, the second liquid crystal cell 20, the third liquid crystal cell 30, and the fourth liquid crystal cell 40, the liquid crystal molecules in each liquid crystal cell change their alignment state under the influence of the transverse electric field as shown in FIG. 7A and FIG. 7B. The table inserted in FIG. 9 shows how the respective polarized components change when light containing the first polarization component PL1 and the second polarization component PL2 pass through each liquid crystal cell. In the following explanation, the same direction as the first polarization direction is the Y-axis direction and the same direction as the second polarization direction is the X-axis direction.

Focusing on the first polarized component PL1 in FIG. 9, the polarization direction of the first polarized component PL1 incident on the first liquid crystal cell 10 is in the direction that intersects (orthogonal to) the long axis direction of the liquid crystal molecules on the first substrate S11 side of the first liquid crystal layer LC1. Therefore, although the liquid crystal molecules on the first substrate S11 side have their refractive index distribution changed by the electric field generated by the first electrode E11, the first polarized component PL1 is not diffused and goes directly to the second substrate S12. The first polarized component PL1 is optically rotated 90 degrees according to the twisting alignment of the liquid crystal molecules in the process of passing through the first liquid crystal layer LC1 from the first substrate S11 side to the second substrate S12 side. As a result, the first polarized component PL1 transitions to the second polarized component PL2. The polarized direction of the second polarized component PL2 is in the direction that intersects the long axis direction of the liquid crystal molecules on the second substrate S12 side. Therefore, although the liquid crystal molecules on the second substrate S12 side have their refractive index distribution changed by the electric field generated by the second electrode E12, the second polarized component PL2 is not affected by the change and is transmitted. In other words, the first polarized component PL1 transitions to the second polarized component PL2 in the process of passing through the first liquid crystal cell 10, and is emitted from the second substrate S12 side without being diffused.

The second polarized component PL2 enters the second liquid crystal cell 20. The second polarized component PL2 has its polarization direction parallel to the long axis direction of the liquid crystal molecules on the first substrate S21 side of the second liquid crystal layer LC2. The liquid crystal molecules on the first substrate S21 side have their refractive index distribution changed by the electric field generated by the first electrode E21, so the second polarized component PL2 is diffused in the X-axis direction. The diffused second polarized component PL2 is optically rotated 90 degrees according to the twisted alignment of the liquid crystal molecules in the process of passing through the second liquid crystal layer LC2 from the first substrate S21 side to the second substrate S22 side. As a result, the second polarized component PL2 transitions again to the first polarized component PL1. The polarization direction of the first polarized component PL1 is parallel to the long axis direction of the liquid crystal molecules on the second substrate S22 side. Since the liquid crystal molecules on the second substrate S22 side have their refractive index distribution changed by the electric field generated by the second electrode E22, the first polarized component is further diffused in the Y-axis direction under the influence of the refractive index distribution of the liquid crystal molecules and is then emitted. That is, the second polarized component PL2 incident on the second liquid crystal cell 20 transitions to the first polarized component PL1 in the process of passing through the second liquid crystal cell 20, and diffuses in the X-axis direction and Y-axis direction.

As described above, the first polarized component PL1 of the incident light is once transitioned to the second polarized component PL2 and then to the first polarized component PL1 again until it enters the first liquid crystal cell 10 and is emitted from the second liquid crystal cell 20, and is diffused once each in the X-axis direction and Y-axis direction in the second liquid crystal cell 20.

For the third liquid crystal cell 30, the longitudinal direction of the first electrode E31 intersects the first electrode E11 of the first liquid crystal cell 10 and the first electrode E21 of the second liquid crystal cell 20 at a 90-degree angle, and the longitudinal direction of the second electrode E32 intersects the second electrode E12 of the first liquid crystal cell 10 and the second electrode E22 of the second liquid crystal cell 20 at a 90-degree angle. Similarly, for the fourth liquid crystal cell 40, the longitudinal direction of the first electrode E41 intersects the first electrode E11 of the first liquid crystal cell 10 and the first electrode E21 of the second liquid crystal cell 20 at a 90-degree angle, and the longitudinal direction of the second electrode E42 intersects the second electrode E12 of the first liquid crystal cell 10 and the second electrode E22 of the second liquid crystal cell 20 at a 90-degree angle. Therefore, for the third liquid crystal cell and fourth liquid crystal cell, for each polarized component, the phenomena occurring in the first liquid crystal cell 10 and the second liquid crystal cell 20 are reversed. The intersecting angles can be set in the range of 90±10 degrees as described above.

That is, when the first polarized component PL1, which passes through the second liquid crystal cell 20 and is diffused once in the X-axis direction and once in the Y-axis direction, enters the third liquid crystal cell 30, the direction of polarized component PL1 is parallel to the long axis direction of the liquid crystal molecules on the first substrate S31 side of the third liquid crystal layer LC3. The liquid crystal molecules on the S31 side of the first substrate change their refractive index distribution due to the electric field generated by the first electrode E31, so the first polarized component PL1 is diffused in the X-axis direction. The diffused first polarized component PL1 is optically rotated 90 degrees according to the twisting alignment of the liquid crystal molecules in the process of passing through the third liquid crystal layer LC3 from the first substrate S31 side to the second substrate S32 side. As a result, the first polarized component PL1 transitions again to the second polarized component PL2. The polarization direction of the second polarized component PL2 is parallel to the long axis direction of the liquid crystal molecules on the second substrate S32 side. Since the refractive index distribution of the liquid crystal molecules on the second substrate S32 side is changed by the electric field generated by the second electrode E32, the second polarized component PL2 is further diffused in the Y-axis direction under the influence of the refractive index distribution of the liquid crystal molecules and is then emitted. That is, the first polarized component PL1 incident on the third liquid crystal cell 30 transitions to the second polarized component PL2 as it passes through the third liquid crystal cell 30, and is diffused again in the X-axis and Y-axis directions.

The polarization direction of the second polarized component PL2 emitted from the third liquid crystal cell 30 and incident on the fourth liquid crystal cell 40 is in the direction that intersects the long axis direction of the liquid crystal molecules on the first substrate S41 side of the fourth liquid crystal layer LC4. Therefore, although the liquid crystal molecules on the first substrate S41 side have their refractive index distribution changed by the electric field generated by the first electrode E41, the second polarized component PL2 is not diffused and goes directly to the second substrate S42. The second polarized component PL2 is optically rotated 90 degrees according to the twisting alignment of the liquid crystal molecules in the process of passing through the fourth liquid crystal layer LC4 from the first substrate S41 side to the second substrate S42 side.

As a result, the second polarized component PL2 transitions to the first polarized component PL1. The polarized direction of the first polarized component PL1 is in the direction that intersects the long axis direction of the liquid crystal molecules on the second substrate S42 side. Therefore, although the liquid crystal molecules on the second substrate S42 side have their refractive index distribution changed by the electric field generated by the second electrode E42, the first polarized component PL1 is not affected by this change and is transmitted. That is, the second polarized component PL2 transitions to the first polarized component PL1 in the process of passing through the fourth liquid crystal cell 40, while the second polarized component PL1 is transmitted through the fourth liquid crystal cell 40 without being diffused.

As described above, the first polarized component PL1 incident on the third liquid crystal cell 30 transitions once to the second polarized component PL2 and then again to the first polarized component PL1 before being emitted from the fourth liquid crystal cell 40, and is diffused once each in the X-axis direction and Y-axis direction by the third liquid crystal cell 30.

Therefore, the first polarized component PL1 emitted from the light source is diffused twice in the X-axis direction and twice in the Y-axis direction between the time it enters the first liquid crystal cell 10 and is emitted from the fourth liquid crystal cell 40.

In FIG. 9, the term "transmission" indicates that the polarized component passes through without being diffused or optically rotated. The term "optically rotation" indicates that the polarized component has transitioned 90 degrees in the direction of polarization. The term "diffusion" indicates that the polarized component is diffused under the influence of the refractive index distribution of the liquid crystal molecules. Therefore, for example, "transmission" at the first electrode in the chart indicates that the above "transmission" phenomenon occurs in the vicinity of the first electrode of the liquid crystal layer. In addition, the term "rotation" in the liquid crystal layer indicates that the polarized component transitions in the direction of polarization by 90 degrees in the process of passing through the liquid crystal layer from the first substrate side to the second substrate side. The same is true for FIG. 12 through FIG. 14.

On the other hand, the second polarized component PL2 has its polarization direction parallel to the long axis direction of the liquid crystal molecules on the first substrate S11 side of the first liquid crystal layer LC1. Therefore, the liquid crystal molecules on the first substrate S11 side have a refractive index distribution due to the electric field generated by the first electrode E11, and the second polarized component PL2 is diffused by this action. The second polarized component PL2 is then optically rotated 90 degrees according to the twisting alignment of the liquid crystal molecules in the process of passing through the first liquid crystal layer LC1 from the first substrate S11 side to the second substrate S12 side. As a result, the second polarized component PL2 transitions to the first polarized component PL1. The polarization direction of the first polarized component PL1 is parallel to the long axis direction of the liquid crystal molecules on the second substrate S12 side. The polarized direction of the first polarized component PL1 is parallel to the long axis direction of the liquid crystal molecules on the second substrate S12 side. Since the liquid crystal molecules on the second substrate S12 side have their refractive index distribution changed by the electric field generated by the second electrode E12, the first polarized component PL1 transitioned by the first liquid crystal layer LC1 is diffused in the Y-axis direction by the refractive index distribution formed by the liquid crystal molecules on the second substrate S12 side. That is, the second polarized component PL2 incident on the first liquid crystal cell 10 is diffused in the X-axis direction and the Y-axis direction while transitioning to the first polarized component PL1 in the process of passing through the first liquid crystal cell 10.

The first polarized component PL1 emitted from the second substrate S12 side of the first liquid crystal cell 10 enters the second liquid crystal cell 20. The polarized direction of the first polarized component PL1 incident on the second liquid crystal cell 20 is in the direction that intersects (orthogonal to) the long axis direction of the liquid crystal molecules on the first substrate S21 side of the second liquid crystal layer LC2. Therefore, although the liquid crystal molecules on the first substrate S21 side have their refractive index distribution changed by the electric field generated by the first electrode E21, the first polarized component PL1 is not diffused and goes directly to the second substrate S22. The first polarized component PL1 is optically rotated 90 degrees according to the twisting alignment of the liquid crystal molecules in the process of passing through the second liquid crystal layer LC2 from the first substrate S21 side to the second substrate S22 side. As a result, the first polarized component PL1 transitions to the second polarized component PL2. The polarized direction of the second polarized component PL2 is in the direction that intersects the long axis direction of the liquid crystal molecules on the second substrate S22 side. Therefore, the liquid crystal molecules on the second substrate S22 side have their refractive index distribution changed by the electric field generated by the second electrode E22, but the second polarized component PL2 is transmitted without being affected by the electric field. That is, the first polarized component PL1 incident on the second liquid crystal cell 20 transitions to the second polarized component PL2 in the process of passing through the second liquid crystal cell 20, but is transmitted without being diffused.

The second polarized component PL2, which is optically rotated 90 degrees in the first liquid crystal cell 10 and the second liquid crystal cell 20, respectively, and diffused once in the X-axis direction and Y-axis direction in the first liquid crystal cell 10, respectively, is incident on the third liquid crystal cell 30. The polarized direction of the second polarized component PL2 incident on the third liquid crystal cell 30 is in the direction that intersects (orthogonal to) the long axis direction of the liquid crystal molecules on the first substrate S31 side of the third liquid crystal layer LC3. Therefore, although the liquid crystal molecules on the first substrate S31 side have their refractive index distribution changed by the electric field generated by the first electrode E31, the second polarized component PL2 is not diffused and goes directly to the second substrate S32. The second polarized component PL2 is optically rotated 90 degrees according to the twisting alignment of the liquid crystal molecules in the process of passing through the third liquid crystal layer LC3 from the first substrate S31 side to the second substrate S32 side. As a result, the second polarized component PL2 transitions to the first polarized component PL1. The polarized direction of the first polarized component PL1 is in the direction that intersects the long axis direction of the liquid crystal molecules on the second substrate S32 side. Therefore, the liquid crystal molecules on the second substrate S32 side have their refractive index distribution changed by the electric field generated by the second electrode E32, but the first polarized component PL1 is transmitted without being affected by the electric field. That is, the second polarized component PL2 incident on the third liquid crystal cell 30 is transmitted to the first polarized component PL1 in the process of passing through the third liquid crystal cell 30, but is transmitted without being diffused.

When the first polarization component PL1, which has passed through the third liquid crystal cell 30, diffused once in the X-axis direction and Y-axis direction, and optically rotated 90 degrees in the first liquid crystal cell 10, second liquid crystal cell 20, and third liquid crystal cell 30, respectively, enters the fourth liquid crystal cell 40, the polarization direction of the first polarization component PL1 is parallel to the long axis direction of the liquid crystal molecules on the first substrate S41 side of the fourth liquid crystal layer LC4. The liquid crystal molecules on the first substrate S41 side of the fourth liquid crystal cell 40 have their refractive index distribution changed by the electric field generated by the first electrode E41, so the first polarization component PL1 is diffused in the X-axis direction. The diffused first polarization component PL1 is optically rotated 90 degrees according to the twisting alignment of the liquid crystal molecules in the process of passing through the fourth liquid crystal layer LC4 from the first substrate S41 side to the second substrate S42 side. As a result, the first polarization component PL1 transitions again to the second polarization component PL2. The polarization direction of the second polarization component PL2 is parallel to the long axis direction of the liquid crystal molecules on the second substrate S42 side. Since the refractive index distribution of the liquid crystal molecules on the second substrate S42 side is changed by the electric field generated by the second electrode E42, the second polarization component PL2 is further diffused in the Y-axis direction under the influence of the refractive index distribution of the liquid crystal molecules and emitted from the second substrate S42 side.

As described above, the second polarization component PL2 incident on the third liquid crystal cell 30 transitions once to the first polarization component PL1 and then again to the second polarization component PL2 before being emitted from the fourth liquid crystal cell 40, and is diffused once each in the X-axis direction and Y-axis direction by the fourth liquid crystal cell 40.

Therefore, the second polarization component PL2 emitted from the light source is diffused twice in the X-axis direction and twice in the Y-axis direction between the time it enters the first liquid crystal cell 10 and is emitted from the fourth liquid crystal cell 40.

Note that (diffuse light 1X) in the table shown in FIG. 9 indicates that the polarized component was diffused once in the X-axis direction before reaching that position, and (diffuse light 1X1Y) indicates that the polarized component was diffused once in the X-axis direction and also once in the Y-axis direction before reaching that position. The same is true for the others.

Figure 11A:
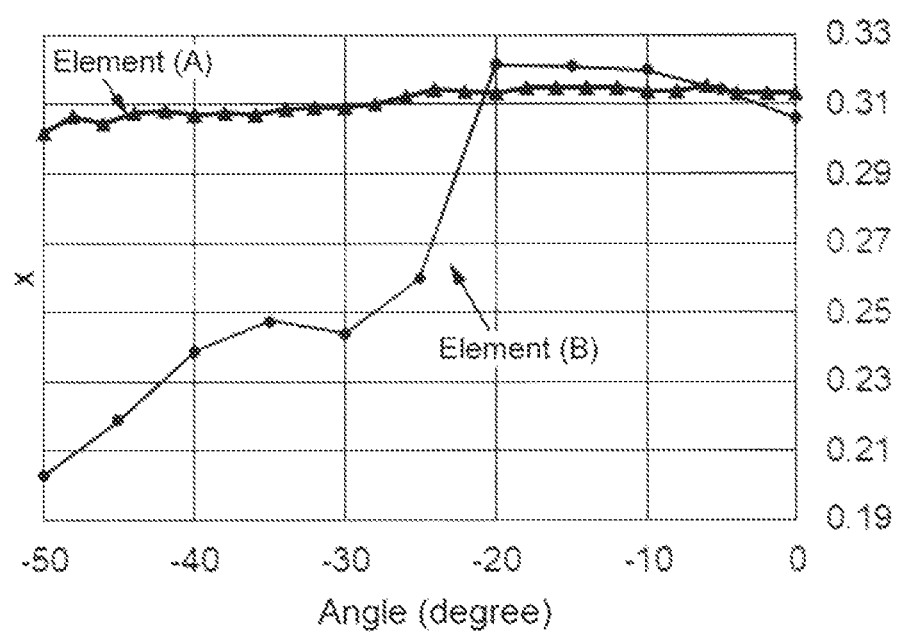
FIG. 11A shows a graph of angular dependence of chromaticity (x-coordinate axis) of a liquid crystal light control device according to an embodiment of the present invention and a reference example.
Figure 11B:
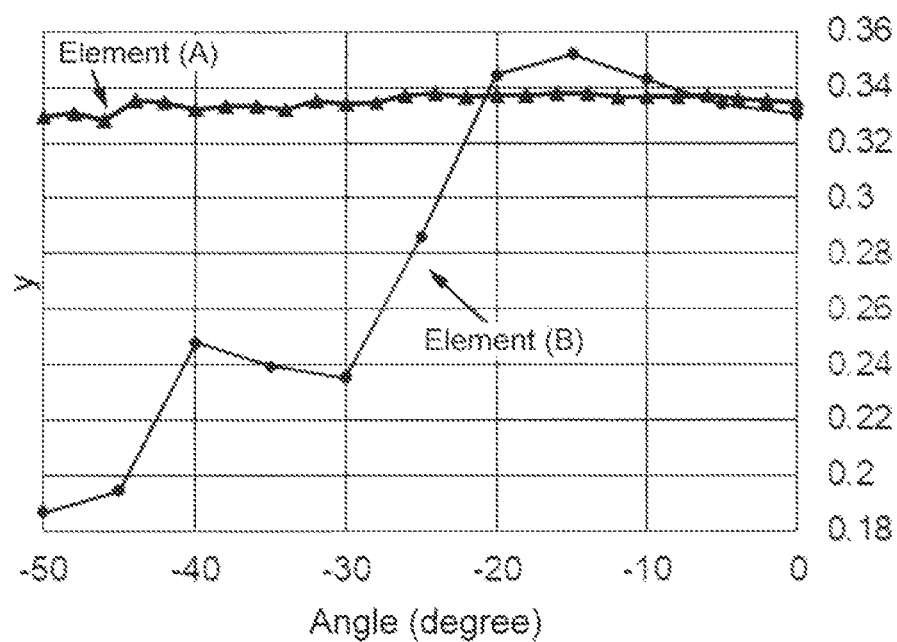
FIG. 11B shows a graph of angular dependence of chromaticity (y-coordinate axis) of a liquid crystal light control device according to an embodiment of the present invention and a reference example.

FIG. 11A and FIG. 11B shows graphs of the angular dependence of the chromaticity of the liquid crystal light control element. FIG. 11A shows the angular dependence of the value of the x-coordinate among the chromaticity coordinates, and FIG. 11B shows the angular dependence of the y-coordinate. FIG. 11A and FIG. 11B show the angular dependence of the chromaticity of an element (A) with four liquid crystal cells and with the third and fourth liquid crystal cells rotated by 90 degrees, as in the liquid crystal light control element 102 of the present embodiment. Each graph also shows the characteristics of an element (B) configured with two liquid crystal cells as a reference example.

As shown in FIG. 11A and FIG. 11B, it can be seen that in the characteristics of element (B), which is a reference example and consists of two liquid crystal cells, the x-coordinate and y-coordinate values change significantly as the angle changes, indicating that the angular dependence of chromaticity is highly dependent on the angle. In contrast, the element (A) with four liquid crystal cells and with the third and fourth liquid crystal cells rotated by 90 degrees, as in the liquid crystal light control element 102 in this embodiment, shows that the angular dependence of chromaticity is further improved. That is, according to the configuration of the liquid crystal light control element 102 in this embodiment, color breaking can be reduced.

Thus, color breaking can be prevented by diffusing one polarized component at least twice in the same direction by electrodes arranged on the light-entering side and electrodes arranged on the opposite side of the light-entering side, which are arranged in different liquid crystal cells and across the liquid crystal layer.

Based on this perspective, it is not necessary to input control signals of the same voltage level to the electrodes of all liquid crystal cells when forming a square-shaped light distribution pattern, the control signal can be different for the pair of the second electrode E12 of the first liquid crystal cell 10 and the first electrode E41 of the fourth liquid crystal cell 40 which diffuse the second polarized component PL2 in the Y-axis direction, the pair of the first electrode E11 of the first liquid crystal cell 10 and the second electrode E42 of the fourth liquid crystal cell 40 which diffuse the second polarized component PL2 in the X-axis direction, the pair of the second electrode E22 of the second liquid crystal cell 20 and the first electrode E31 of the third liquid crystal cell 30 which diffuse the first polarized component PL1 in the Y-axis direction, and the pair of the first electrode E21 of the second liquid crystal cell 20 and the second electrode E32 of the third liquid crystal cell 30, which diffuse the first polarized component PL1 in the X-axis direction.

Figure 10B:
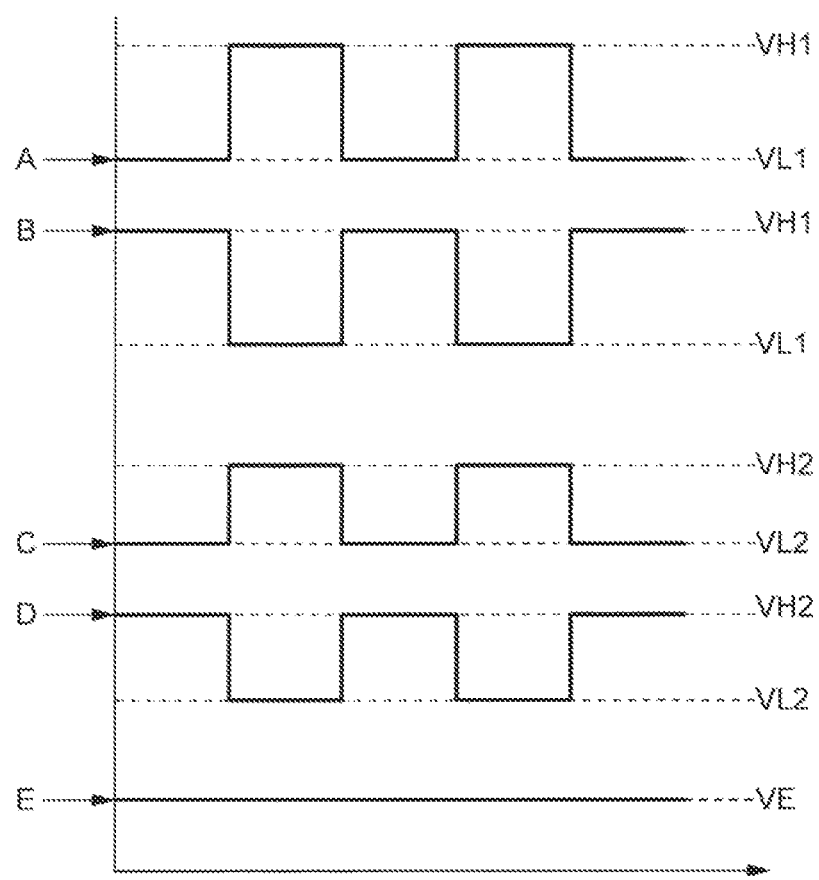
FIG. 10B is a voltage waveform applied to a liquid crystal cell in a liquid crystal light control device according to an embodiment of the present invention.

Table 2 shows an example of a case where the voltage level of the control signal is the same for each of the above pairs of units, and control signals of different voltage levels are input to the first electrode and the second electrode of one liquid crystal cell. The control signals A, B, C, D, and E in Table 2 correspond to the control signals shown in FIG. 10B. In FIG. 10B, the voltage levels of the control signals A, B, C, D, and E have the relationship VH1>VH2>VE>VL2>VL1. For example, the voltage can be set to VL2=−12V and VH2=12V when VL1=−15V and VH1=15V.

TABLE 2

| Liquid Crystal Light Control Element: 102 | | | | Control Signal |
|---|---|---|---|---|
| Fourth Liquid Crystal Cell 40 | Second Substrate E42 | 2nd Electrode E42 | 4th strip electrode: E42B | D |
| | | | 3rd strip electrode: E42A | C |
| | First Substrate E41 | 1st Electrode E41 | 2nd strip electrode: E41B | B |
| | | | 1st strip electrode: E41A | A |
| Third Liquid Crystal Cell 30 | Second Substrate E32 | 2nd Electrode E32 | 4th strip electrode: E32B | B |
| | | | 3rd strip electrode: E32A | A |
| | First Substrate E31 | 1st Electrode E31 | 2nd strip electrode: E31B | D |
| | | | 1st strip electrode: E31A | C |
| Second Liquid Crystal Cell 20 | Second Substrate E22 | 2nd Electrode E22 | 4th strip electrode: E22B | D |
| | | | 3rd strip electrode: E22A | C |
| | First Substrate E21 | 1st Electrode E21 | 2nd strip electrode: E21B | B |
| | | | 1st strip electrode: E21A | A |
| First Liquid Crystal Cell 10 | Second Substrate E12 | 2nd Electrode E12 | 4th strip electrode: E12B | B |
| | | | 3ed strip electrode: E12A | A |
| | First Substrate E11 | 1st Electrode E11 | 2nd strip electrode: E11B | D |
| | | | 1st strip electrode: E11A | C |

According to the combination of the control signals shown in Table 2, the size of each polarized component diffused in the Y-axis direction and the X-axis direction can be different, which allows for variations in the square-shaped light distribution pattern. For example, it is possible to form a square-shaped or rectangular-shaped light distribution pattern by adjusting the voltage levels of the control signals A, B, C, and D.

When the same pattern of the control signals as shown in Table 1 is applied to each of the liquid crystal cells in the liquid crystal light control element with such an arrangement of liquid crystal cells, as described above, it is possible to form a square-shaped light distribution pattern because the first polarized component PL1 and the second polarized component PL2 are equally diffused in the X-axis direction and the Y-axis direction. In addition, as described below, color breaking can be prevented in the light distribution pattern.

(2) Cross-Shaped Light Distribution Pattern

Figure 12:
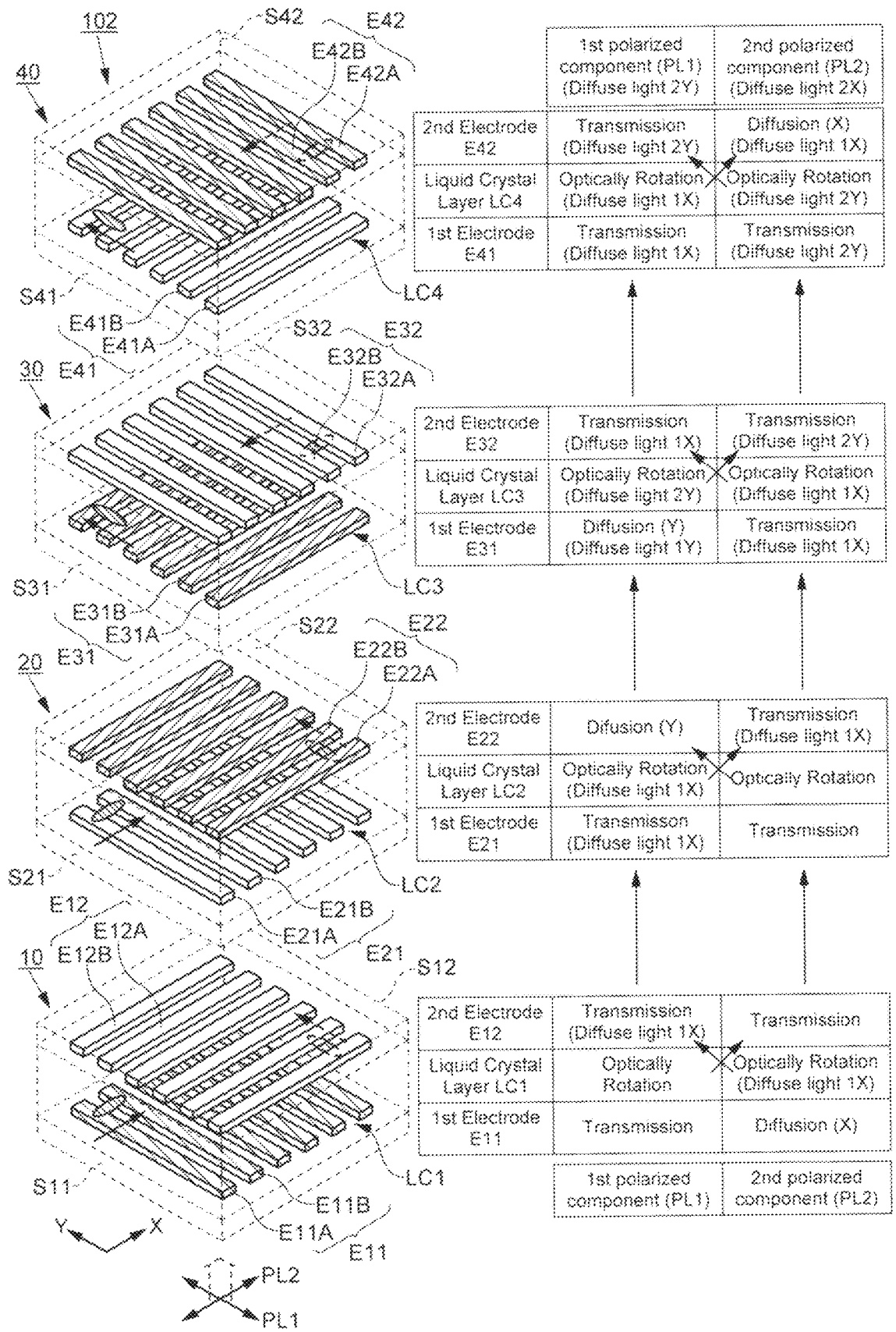
FIG. 12 is a diagram illustrating operation of a liquid crystal light control device according to an embodiment of the present invention.

FIG. 12 shows an example of controlling the light emitted from the light source unit 106 to a cross-shaped light distribution pattern. The arrangement of each liquid crystal cell of the liquid crystal light control element 102 shown in FIG. 12 is the same as in FIG. 9.

Table 3 shows the control signals applied to each liquid crystal cell in the liquid crystal light control element 102 shown in FIG. 12. The control signals A, B, and C shown in Table 3 correspond to the control signals shown in FIG. 10A.

TABLE 3

| Liquid Crystal Light Control Element: 102 | | | | Control Signal |
|---|---|---|---|---|
| Fourth Liquid Crystal Cell 40 | Second Substrate | 2nd Electrode E42 | 4th strip electrode: E42B | B |
| | | | 3rd strip electrode: E42A | A |
| | First Substrate | 1st Electrode E41 | 2nd strip electrode: E41B | E |
| | | | 1st strip electrode: E41A | E |
| Third Liquid Crystal Cell 30 | Second Substrate | 2nd Electrode E32 | 4th strip electrode: E32B | E |
| | | | 3rd strip electrode: E32A | E |
| | First Substrate | 1st Electrode E31 | 2nd strip electrode: E31B | B |
| | | | 1st strip electrode: E31A | A |
| Second Liquid Crystal Cell 20 | Second Substrate | 2nd Electrode E22 | 4th strip electrode: E22B | B |
| | | | 3rd strip electrode: E22A | A |
| | First Substrate | 1st Electrode E21 | 2nd strip electrode: E21B | E |
| | | | 1st strip electrode: E21A | E |
| First Liquid Crystal Cell 10 | Second Substrate | 2nd Electrode E12 | 4th strip electrode: E12B | E |
| | | | 3rd strip electrode: E12A | E |
| | First Substrate | 1st Electrode E11 | 2nd strip electrode: E11B | B |
| | | | 1st strip electrode: E11A | A |

As shown in Table 3, when forming the cross-shaped light distribution pattern, a control signal to generate the transverse electric field is input to the first electrode E11 of the first liquid crystal cell 10, the second electrode E22 of the second liquid crystal cell 20, the first electrode E31 of the third liquid crystal cell 30, and the second electrode E42 of the fourth liquid crystal cell 40, and a constant voltage control signal E is input to the second electrode E12 of the first liquid crystal cell 10, the first electrode E21 of the second liquid crystal cell 20, the second electrode E32 of the third liquid crystal cell 30, and the first electrode E41 of the fourth liquid crystal cell 40 to control a state where no transverse electric field is generated. The terms "transmission", "diffusion", and "optically rotation" in FIG. 9 basically correspond to the term's "transmission", "diffusion", and "optically rotation" referred to in the explanation of FIG. 9. In the drive of FIG. 12, there is a condition in which the same potential is applied to electrodes located on the same substrate, but when the same potential is applied, there is no potential difference between the electrodes and no electric field is acting on the liquid crystal layer. Therefore, the liquid crystal molecules located on the substrate side do not change their alignment state from the initial alignment. For this reason, polarized components that pass through the liquid crystal layer in such an electroless state will pass through without diffusion. This case is also included in "transmission".

First, the first polarized component PL1 is focused on in FIG. 12. The polarization direction of the first polarized component PL1 incident on the first liquid crystal cell 10 is in the direction that intersects the long axis direction of the liquid crystal molecules on the first substrate S11 side of the first liquid crystal layer LC1, and the first electrode E11 on the first substrate S11 side forms the electric field (the electrode forming the electric field is shown by hatching in FIG. 12. The same is true in FIG. 13 and FIG. 14 below.). Under such conditions, the first polarized component PL1 passes through the first liquid crystal layer LC1 on the first substrate S11 side without diffusing. The first polarized component PL1 is optically rotated by 90 degrees in the process of passing through the first liquid crystal layer LC1, and transitions to the second polarized component PL2. The polarization direction of the second polarized component PL2 is in the direction that intersects the long axis direction of the liquid crystal molecules on the second substrate S12 side, and the second electrode E12 on the second substrate S12 side does not form an electric field (the electrode that does not form an electric field is indicated by a white background in FIG. 12. The same is also true in FIG. 13 and FIG. 14.). Under such conditions, the second polarized component PL2 is transmitted through the first liquid crystal layer LC1 on the second substrate S12 side without diffusion and is emitted into the second liquid crystal cell 20.

The polarization direction of the second polarized component PL2 incident on the second liquid crystal cell 20 is parallel to the long axis direction of the liquid crystal molecules on the first substrate S21 side of the second liquid crystal layer LC2, and the first electrode E21 on the first substrate S21 side does not form the electric field. Under such conditions, the second polarized component PL2 passes through the second liquid crystal layer LC2 on the S21 side of the first substrate without diffusing. The second polarized component PL2 is optically rotated by 90 degrees in the process of passing through the second liquid crystal layer LC2, and transitions again to the first polarized component PL1. The polarization direction of the first polarized component PL1 is parallel to the long axis direction of the liquid crystal molecules on the second substrate S22 side, and the second electrode E22 on the second substrate S22 side forms the electric field. Under such conditions, the first polarized component PL1 diffuses in the Y-axis direction and is then emitted into the third liquid crystal cell 30.

The polarization direction of the first polarized component PL1 incident on the third liquid crystal cell 30 is parallel to the long axis direction of the liquid crystal molecules on the first substrate S31 side of the third liquid crystal layer LC3, and the first electrode E31 on the first substrate S31 side forms the electric field. Under these conditions, the first polarized component PL1 diffuses in the Y-axis direction and passes toward the second substrate S32. The first polarized component PL1 is optically rotated 90 degrees in the process of passing through the third liquid crystal layer LC3, and transitions again to the second polarized component PL2. The polarization direction of the second polarized component PL2 is parallel to the long axis direction of the liquid crystal molecules on the second substrate S32 side, and the second electrode E32 on the second substrate S32 side does not form the electric field. Under such conditions, the second polarized component PL2 passes through the third liquid crystal layer LC3 on the second substrate S32 side without diffusing and is emitted into the fourth liquid crystal cell 40.

The polarization direction of the second polarized component PL2 incident on the fourth liquid crystal cell 40 is in the direction that intersects the long axis direction of the liquid crystal molecules on the first substrate S41 side of the fourth liquid crystal layer LC4, and the first electrode E41 on the first substrate S41 side does not form an electric field. Under such conditions, the second polarized component PL2 passes through the fourth liquid crystal layer LC4 on the first substrate S41 side without diffusing. The second polarized component PL2 is optically rotated 90 degrees in the process of passing through the fourth liquid crystal layer LC4, and transitions again to the first polarized component PL1. The polarized direction of the first polarized component PL1 is in the direction that intersects the long axis direction of the liquid crystal molecules on the second substrate S42 side, and the second electrode E42 on the second substrate S42 side forms the electric field. Under such conditions, the first polarized component PL1 is emitted from the fourth liquid crystal cell 40 without diffusion.

Thus, when the liquid crystal light control element 102 shown in FIG. 12 is driven at the potentials shown in Table 3, the first polarized component PL1 of the light emitted from the light source is optically rotated four times in the process of passing from the first liquid crystal cell 10 to the fourth liquid crystal cell 40 and diffused twice in the Y-axis direction.

Next, focusing on the second polarized component PL2 in FIG. 12. The polarized direction of the second polarized component PL2 incident on the first liquid crystal cell 10 is parallel to the long axis direction of the liquid crystal molecules on the first substrate S11 side of the first liquid crystal layer LC1, and the first electrode E11 on the first substrate S11 side forms the electric field. Under such conditions, the second polarized component PL2 diffuses in the X-axis direction and passes through the first liquid crystal layer LC1 on the first substrate side. The second polarized component PL2 is optically rotated 90 degrees in the process of passing through the first liquid crystal layer LC1, and transitions to the first polarized component PL1. The polarization direction of the first polarized component PL1 is parallel to the long axis direction of the liquid crystal molecules on the second substrate S12 side, and the second electrode E12 on the second substrate S12 side does not form the electric field. Under such conditions, the first polarized component PL1 passes through the first liquid crystal layer PC1 on the second substrate S12 side without diffusing and is emitted into the second liquid crystal cell 20.

The polarization direction of the first polarized component PL1 incident on the second liquid crystal cell 20 is in the direction that intersects the long axis direction of the liquid crystal molecules on the first substrate S21 side of the second liquid crystal layer LC2, and the first electrode E21 on the first substrate S21 side does not form the electric field. Under such conditions, the first polarized component PL1 passes through the second liquid crystal layer LC2 on the first substrate S21 side without diffusing. The first polarized component PL1 is optically rotated 90 degrees in the process of passing through the second liquid crystal layer LC2, and transitions again to the second polarized component PL2. The polarization direction of the second polarized component PL2 is parallel to the long axis direction of the liquid crystal molecules on the second substrate S22 side of the second liquid crystal layer LC2, and the second electrode E22 on the second substrate S22 side forms the electric field. Under such conditions, the second polarized component diffuses in the X-axis direction and is then emitted into the third liquid crystal cell 30.

The polarization direction of the second polarized component PL2 incident on the third liquid crystal cell 30 is in the direction that intersects the long axis direction of the liquid crystal molecules on the first substrate S31 side of the third liquid crystal layer LC3, and the first electrode E31 on the first substrate S31 side forms the electric field. Under such conditions, the second polarized component PL2 passes through the third liquid crystal layer LC3 on the first substrate side without diffusing. The second polarized component PL2 is optically rotated 90 degrees in the process of passing through the third liquid crystal layer LC3, and transitions again to the first polarized component PL1. The polarization direction of the first polarized component PL1 is in the direction that intersects the long axis direction of the liquid crystal molecules on the second substrate S32 side, and the second electrode E32 on the second substrate S32 side does not form an electric field. Under such conditions, the first polarized component PL1 is transmitted through the third liquid crystal layer LC3 on the second substrate S32 side without diffusion and is emitted into the fourth liquid crystal cell 40.

The polarization direction of the first polarized component PL1 incident on the fourth liquid crystal cell 40 is parallel to the long axis direction of the liquid crystal molecules on the first substrate S41 side of the fourth liquid crystal layer LC4, and the first electrode E41 on the first substrate S41 side does not form the electric field. Under such conditions, the first polarized component PL1 passes through the fourth liquid crystal layer LC4 on the first substrate S41 side without diffusing. The first polarized component PL1 is optically rotated 90 degrees in the process of passing through the fourth liquid crystal layer LC4, and transitions again to the second polarized component PL2. The polarization direction of the second polarized component PL2 is parallel to the long axis direction of the liquid crystal molecules on the second substrate S42 side, and the second electrode E42 on the second substrate S42 side forms the electric field. Under such conditions, the second polarized component PL2 diffuses in the X-axis direction and is then emitted from the fourth liquid crystal cell 40.

Thus, when the liquid crystal light control element 102 shown in FIG. 12 is driven at the potentials shown in Table 3, the second polarized component PL2 of the light emitted from the light source is optically rotated four times in the process of passing from the first liquid crystal cell 10 through the fourth liquid crystal cell 40 and diffused twice in the X-axis direction.

As described above, according to the operation mode shown in FIG. 12 and Table 3, when the light emitted from the light source unit 106 passes through the liquid crystal light control element 102, the first polarized component PL1 is diffused twice in the Y-axis direction and the second polarized component PL2 is diffused twice in the X-axis direction. Thereby, the light emitted from the light source unit 106 can be formed into a cross-shaped light distribution pattern. As will be described later, color breaking can also be prevented in this light distribution pattern.

Similar to the example of square light distribution, a pair of the second electrode E12 of the first liquid crystal cell 10 and the first electrode E41 of the fourth liquid crystal cell 40 that diffuses the second polarized component PL2 in the Y-axis direction, a pair of the first electrode E11 of the first liquid crystal cell and the second electrode E42 of the fourth liquid crystal cell 40 that diffuses the second polarized component PL2 in the X-axis direction, a pair of the second electrode E22 of the second liquid crystal cell 20 and the first electrode E31 of the third liquid crystal cell 30 that diffuses the first polarized component PL1 in the Y-axis direction, and a pair of the first electrode E21 of the second liquid crystal cell 20 and the second electrode E32 of the third liquid crystal cell 30, which diffuse the first polarized component PL1 in the X-axis direction, can also form a cross-shaped light distribution pattern by applying the control signals shown in Table 4. The control signals shown in Table 4 correspond to FIG. 10B.

TABLE 4

| Liquid Crystal Light Control Element: 102 | | | | Control Signal |
|---|---|---|---|---|
| Fourth | Second | 2nd Electrode | 4th strip electrode: E42B | B |
| Liquid | Substrate | E42 | 3rd strip electrode: E42A | A |
| Crystal | First | 1st Electrode | 2nd strip electrode: E41B | E |
| Cell 40 | Substrate | E41 | 1st strip electrode: E41A | E |
| Third | Second | 2nd Electrode | 4th strip electrode: E32B | E |
| Liquid | Substrate | E32 | 3rd strip electrode: E32A | E |
| Crystal | First | 1st Electrode | 2nd strip electrode: E31B | D |
| Cell 30 | Substrate | E31 | 1st strip electrode: E31A | C |
| Second | Second | 2nd Electrode | 4th strip electrode: E22B | D |
| Liquid | Substrate | E22 | 3rd strip electrode: E22A | C |
| Crystal | First | 1st Electrode | 2nd strip electrode: E21B | E |
| Cell 20 | Substrate | E21 | 1st strip electrode: E21A | E |
| First | Second | 2nd Electrode | 4th strip electrode: E12B | E |
| Liquid | Substrate | E12 | 3rd strip electrode: E12A | E |
| Crystal | First | 1st Electrode | 2nd strip electrode: E11B | B |
| Cell 10 | Substrate | E11 | 1st strip electrode: E11A | A |

(3) Line-Shaped Light Distribution Pattern (X-Axis Direction)

Figure 13:
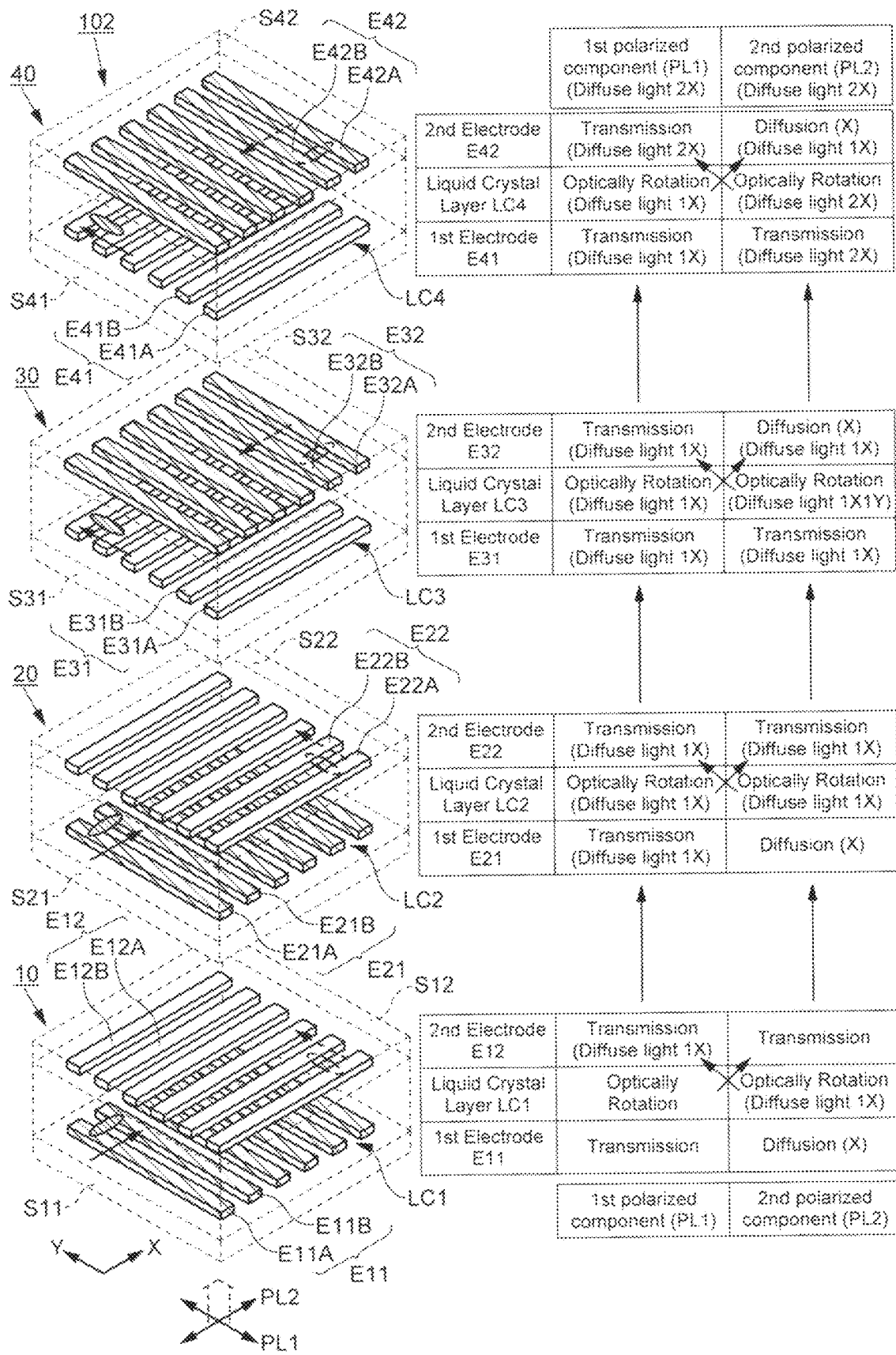
FIG. 13 is a diagram illustrating operation of a liquid crystal light control device according to an embodiment of the present invention.

FIG. 13 shows an example of controlling the light emitted from the light source unit 106 to a line-shaped (X-axis direction) light distribution pattern. The arrangement of each liquid crystal cell of the liquid crystal light control element shown in FIG. 13 is the same as in FIG. 9.

Table 5 shows the control signals applied to each liquid crystal cell in the liquid crystal light control element 102 shown in FIG. 13. The control signals A, B, and C shown in Table 5 correspond to the control signals shown in FIG. 10A.

TABLE 5

| Liquid Crystal Light Control Element: 102 | | | | Control Signal |
|---|---|---|---|---|
| Fourth | Second | 2nd Electrode | 4th strip electrode: E42B | B |
| Liquid | Substrate | E42 | 3rd strip electrode: E42A | A |
| Crystal | First | 1st Electrode | 2nd strip electrode: E41B | E |
| Cell 40 | Substrate | E41 | 1st strip electrode: E41A | E |
| Third | Second | 2nd Electrode | 4th strip electrode: E32B | B |
| Liquid | Substrate | E32 | 3rd strip electrode: E32A | A |
| Crystal | First | 1st Electrode | 2nd strip electrode: E31B | E |
| Cell 30 | Substrate | E31 | 1st strip electrode: E31A | E |
| Second | Second | 2nd Electrode | 4th strip electrode: E22B | E |
| Liquid | Substrate | E22 | 3rd strip electrode: E22A | E |
| Crystal | First | 1st Electrode | 2nd strip electrode: E21B | B |
| Cell 20 | Substrate | E21 | 1st strip electrode: E21A | A |
| First | Second | 2nd Electrode | 4th strip electrode: E12B | E |
| Liquid | Substrate | E12 | 3rd strip electrode: E12A | E |
| Crystal | First | 1st Electrode | 2nd strip electrode: E11B | B |
| Cell 10 | Substrate | E11 | 1st strip electrode: E11A | A |

As shown in Table 5, when forming a line-shaped light distribution pattern extending in the X-axis direction, a control signal to generate the transverse electric field is input to the first electrode E11 of the first liquid crystal cell 10, the first electrode E21 of the second liquid crystal cell 20, the second electrode E32 of the third liquid crystal cell 30 and the second electrode E42 of the fourth liquid crystal cell 40, and the control signal E of a constant voltage is input to the second electrode E12 of the first liquid crystal cell 10, the first electrode E21 of the second liquid crystal cell 20, the first electrode E31 of the third liquid crystal cell 30, and the first electrode E41 of the fourth liquid crystal cell 40 to control the state where the transverse electric field is not generated.

Focusing on the first polarized component PL1 in FIG. 13, the direction of polarization of the first polarized component PL1 entering the first liquid crystal cell 10 is in the direction that intersects (orthogonal to) the long axis direction of the liquid crystal molecules in the first liquid crystal layer LC1, so it enters without being scattered, and is optically rotated 90 degrees in the first liquid crystal layer LC1, and transitions to the second polarized component PL2.

The second polarized component PL2 incident on the second liquid crystal cell 20 is diffused in the X-axis direction by the liquid crystal molecules under the action of the electric field of the first electrode E21, and is optically rotated by the second liquid crystal layer LC2 to transition to the first polarized component PL1 (1X) and passes through the second liquid crystal cell 20. The first polarized component PL1 (1X) incident on the third liquid crystal cell 30 is optically rotated by the third liquid crystal layer LC3, transitions to the second polarized component PL2 (1X), is further diffused in the X-axis direction by liquid crystal molecules under the action of the electric field of the second electrode E32, and transitions to the second polarized component PL2 (2X) after passing through the third liquid crystal cell 30 (2X). The second polarized component PL2 (2X) incident on the fourth liquid crystal cell 40 is optically rotated by the fourth liquid crystal layer LC4, transitions to the first polarized component PL1 (2X), and is emitted from the fourth liquid crystal cell 40.

In contrast, the second polarized component PL2 is diffused in the X-axis direction by the liquid crystal molecules under the action of the electric field of the first electrode E11 of the first liquid crystal cell 10, and is rotated by the first liquid crystal layer LC1 to transition to the first polarized component PL1 (1X), which then enters the second liquid crystal cell 20. The first polarized component PL1 (1X), diffused once in the X-axis direction, is optically rotated by the second liquid crystal layer LC2 of the second liquid crystal cell 20, and transitions to the second polarized component PL2 (1X), which enters the third liquid crystal cell 30. The second polarized component PL2 (1X) is optically rotated by the third liquid crystal layer LC3 of the third liquid crystal cell 30, and transitions to the first polarized component PL1 (1X), which enters the fourth liquid crystal cell 40. The first polarized component PL1 (1X) is optically rotated in the fourth liquid crystal layer LC4, further diffused again in the X-axis direction by the liquid crystal molecules under the action of the electric field of the second electrode E42, and transitions to the second polarized component PL2 (2X), which is emitted from the fourth liquid crystal cell 40.

Similar to the example of square light distribution, it is possible to form a line-shaped light distribution pattern extending in the X-axis direction by applying the control signals shown in Table 6, corresponding to a pair of the first electrode E11 of the first liquid crystal cell 10 and the second electrode E42 of the fourth liquid crystal cell 40 that diffuse the second polarized component PL2 in the X-axis direction, and a pair of the first electrode E21 of the second liquid crystal cell 20 and the second electrode E32 of the third liquid crystal cell 30 that diffuse the first polarized component PL1 in the X-axis direction. The control signals shown in Table 6 correspond to FIG. 10B.

TABLE 6

| Liquid Crystal Light Control Element: 102 | | | | Control Signal |
|---|---|---|---|---|
| Fourth | Second | 2nd Electrode | 4th strip electrode: E42B | B |
| Liquid | Substrate | E42 | 3rd strip electrode: E42A | A |
| Crystal | First | 1st Electrode | 2nd strip electrode: E41B | E |
| Cell 40 | Substrate | E41 | 1st strip electrode: E41A | E |
| Third | Second | 2nd Electrode | 4th strip electrode: E32B | D |
| Liquid | Substrate | E32 | 3rd strip electrode: E32A | C |
| Crystal | First | 1st Electrode | 2nd strip electrode: E31B | E |
| Cell 30 | Substrate | E31 | 1st strip electrode: E31A | E |
| Second | Second | 2nd Electrode | 4th strip electrode: E22B | E |
| Liquid | Substrate | E22 | 3rd strip electrode: E22A | E |
| Crystal | First | 1st Electrode | 2nd strip electrode: E21B | D |
| Cell 20 | Substrate | E21 | 1st strip electrode: E21A | C |
| First | Second | 2nd Electrode | 4th strip electrode: E12B | E |
| Liquid | Substrate | E12 | 3rd strip electrode: E12A | E |
| Crystal | First | 1st Electrode | 2nd strip electrode: E11B | B |
| Cell 10 | Substrate | E11 | 1st strip electrode: E11A | A |

According to the operation mode shown in FIG. 13 and Table 5 and Table 6, when light emitted from the light source unit 106 passes through the liquid crystal light control element 102, the first polarized component PL1 is diffused twice in the X-axis direction, and the second polarized component PL2 is diffused twice in the X-axis direction. Thereby, the light emitted from the light source unit 106 can be formed into the line-shaped light distribution pattern extending in the X-axis direction. As will be described later, this light distribution pattern can also prevent color breaking.

(4) Line Shape Light Distribution Pattern (Y-Axis Direction)

Figure 14:
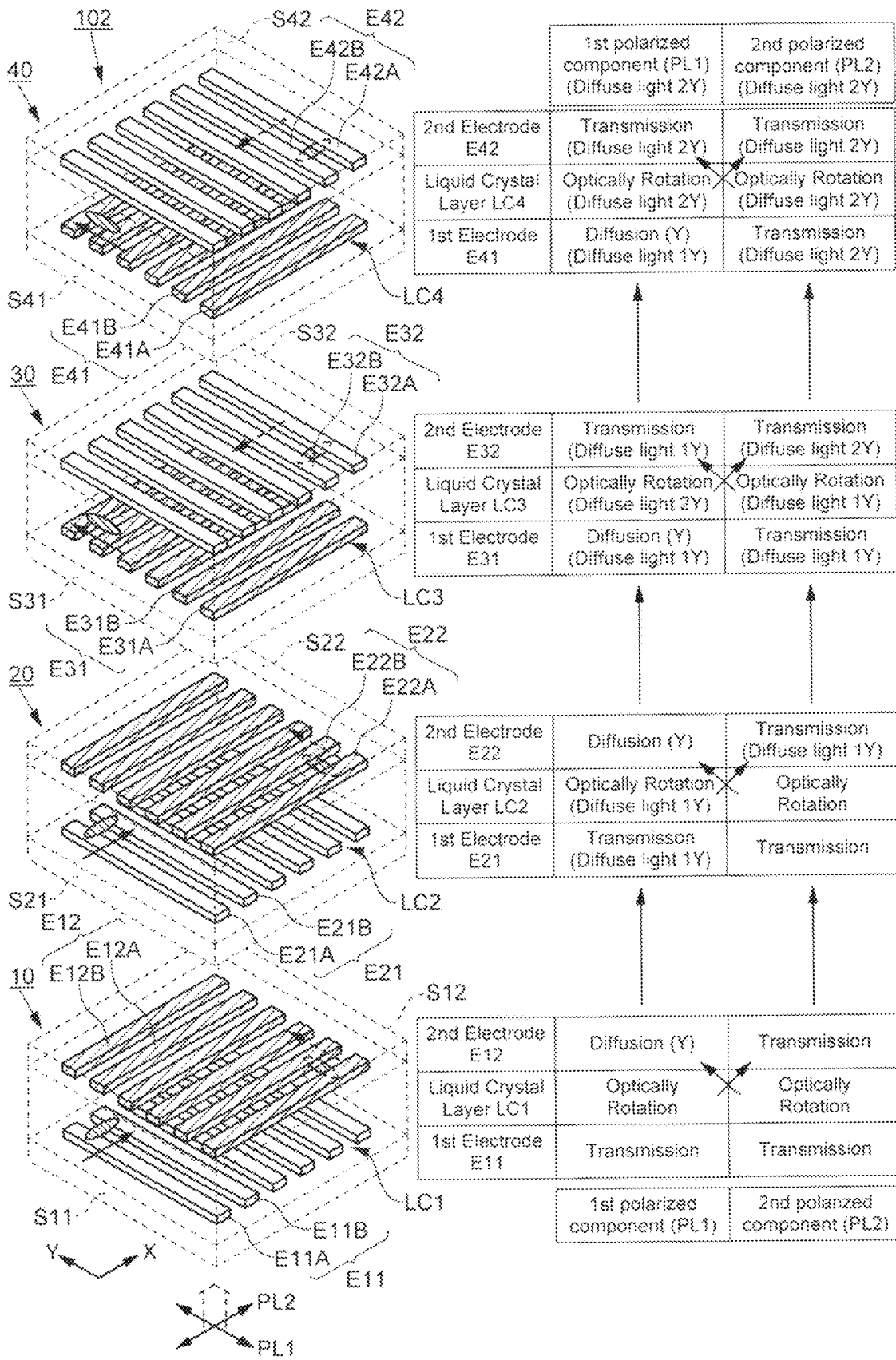
FIG. 14 is a diagram illustrating operation of a liquid crystal light control device according to an embodiment of the present invention.

FIG. 14 shows an example of controlling the light emitted from the light source unit 106 to a line-shaped (Y-axis direction) light distribution pattern. The arrangement of each liquid crystal cell of the liquid crystal light control element shown in FIG. 14 is the same as in FIG. 9.

Table 7 shows the control signals applied to each liquid crystal cell in the liquid crystal light control element 102 shown in FIG. 14. The control signals A, B, and E shown in Table 7 correspond to the control signals shown in FIG. 10A.

TABLE 7

| Liquid Crystal Light Control Element: 102 | | | | Control Signal |
|---|---|---|---|---|
| Fourth | Second | 2nd Electrode | 4th strip electrode: E42B | E |
| Liquid | Substrate | E42 | 3rd strip electrode: E42A | E |
| Crystal | First | 1st Electrode | 2nd strip electrode: E41B | B |
| Cell 40 | Substrate | E41 | 1st strip electrode: E41A | A |
| Third | Second | 2nd Electrode | 4th strip electrode: E32B | E |
| Liquid | Substrate | E32 | 3rd strip electrode: E32A | E |
| Crystal | First | 1st Electrode | 2nd strip electrode: E31B | B |
| Cell 30 | Substrate | E31 | 1st strip electrode: E31A | A |
| Second | Second | 2nd Electrode | 4th strip electrode: E22B | B |
| Liquid | Substrate | E22 | 3rd strip electrode: E22A | A |
| Crystal | First | 1st Electrode | 2nd strip electrode: E21B | E |
| Cell 20 | Substrate | E21 | 1st strip electrode: E21A | E |
| First | Second | 2nd Electrode | 4th strip electrode: E12B | B |
| Liquid | Substrate | E12 | 3rd strip electrode: E12A | A |
| Crystal | First | 1st Electrode | 2nd strip electrode: E11B | E |
| Cell 10 | Substrate | E11 | 1st strip electrode: E11A | E |

As shown in Table 7, when forming a line-shaped light distribution pattern extending in the Y-axis direction, the first electrode E11 of the first liquid crystal cell 10, the first electrode E21 of the second liquid crystal cell 20, the second electrode E32 of the third liquid crystal cell 30, and the second electrode E42 of the fourth liquid crystal cell 40 are input with the constant voltage control signal E to prevent the generation of the transverse electric field, the second electrode E12 of the first liquid crystal cell 10, the first electrode E22 of the second liquid crystal cell 20, the first electrode E31 of the third liquid crystal cell 30, and the first electrode E41 of the fourth liquid crystal cell 40 are input with the control signals A and B to generate a transverse electric field.

Focusing on the first polarized component PL1 in FIG. 14, the direction of polarization of the first polarized component PL1 entering the first liquid crystal cell 10 is in the direction that intersects (orthogonal to) the long axis direction of the liquid crystal molecules in the first liquid crystal layer LC1, so it enters without being scattered, and is optically rotated 90 degrees in the first liquid crystal layer LC1, and transitions to the second polarized component PL2.

The second polarized component PL2 incident on the second liquid crystal cell 20 is optically rotated by the second liquid crystal layer LC2, diffused in the Y-axis direction by liquid crystal molecules under the action of the electric field of the second electrode E22, and transitions to the first polarized component PL1 (1Y). The first polarized component PL1 (1Y) incident on the third liquid crystal cell 30 is diffused in the Y-axis direction by liquid crystal molecules under the action of the electric field of the first electrode E31, and is optically rotated by the third liquid crystal layer LC3 to transition to the second polarized component PL2 (2Y). The second polarized component PL2 (2Y) incident on the fourth liquid crystal cell 40 is optically rotated by the fourth liquid crystal layer LC4, transitions to the first polarized component PL1 (2Y), and is emitted from the fourth liquid crystal cell 40.

In contrast, the second polarized component PL2 is optically rotated by the first liquid crystal layer LC1, diffused in the Y-axis direction by the liquid crystal molecules under the action of the electric field of the second electrode E12, and transitions to the first polarized component PL1 (1Y). The first polarized component PL1 (1Y) incident on the second liquid crystal cell 20 is optically rotated by the second liquid crystal layer LC2 and transitions to the second polarized component PL2 (1Y). The second polarized component PL2 (1Y) enters the third liquid crystal cell 30, and is optically rotated by the third liquid crystal layer LC3, and transitions to the first polarized component PL1 (1Y), which enters the fourth liquid crystal cell 40. The first polarized component PL1 (1Y) is diffused in the Y-axis direction by the liquid crystal molecules under the action of the electric field of the first electrode E41, and is optically rotated in the fourth liquid crystal layer LC4 and emitted as the second polarized component LC2 (2Y).

As in the example of square light distribution, it is possible to form a line shaped light distribution pattern extending in the Y-axis direction by applying the control signals shown in Table 8, a pair of the second electrode E12 of the first liquid crystal cell 10 and the first electrode E41 of the fourth liquid crystal cell 40 that diffuses the second polarized component PL2 in the Y-axis direction, and a pair of the second electrode E22 of the second liquid crystal cell 20 and the first electrode E31 of the third liquid crystal cell 30 that diffuse the first polarized component PL1 in the Y-axis direction. The control signals shown in Table 8 correspond to FIG. 10B.

TABLE 8

| Liquid Crystal Light Control Element: 102 | | | | Control Signal |
|---|---|---|---|---|
| Fourth Liquid Crystal Cell 40 | Second Substrate | 2nd Electrode E42 | 4th strip electrode: E42B | E |
| | | | 3rd strip electrode: E42A | E |
| | First Substrate | 1st Electrode E41 | 2nd strip electrode: E41B | B |
| | | | 1st strip electrode: E41A | A |
| Third Liquid Crystal Cell 30 | Second Substrate | 2nd Electrode E32 | 4th strip electrode: E32B | E |
| | | | 3rd strip electrode: E32A | E |
| | First Substrate | 1st Electrode E31 | 2nd strip electrode: E31B | D |
| | | | 1st strip electrode: E31A | C |
| Second Liquid Crystal Cell 20 | Second Substrate | 2nd Electrode E22 | 4th strip electrode: E22B | D |
| | | | 3rd strip electrode: E22A | C |
| | First Substrate | 1st Electrode E21 | 2nd strip electrode: E21B | E |
| | | | 1st strip electrode: E21A | E |
| First Liquid Crystal Cell 10 | Second Substrate | 2nd Electrode E12 | 4th strip electrode: E12B | B |
| | | | 3rd strip electrode: E12A | A |
| | First Substrate | 1st Electrode E11 | 2nd strip electrode: E11B | E |
| | | | 1st strip electrode: E11A | E |

According to the operation mode shown in FIG. 14 and Tables 7 and 8, the light emitted from the light source unit 106 passes through the liquid crystal light control element 102, causing the first polarized component PL1 to be diffused twice in the Y-axis direction and the second polarized component PL2 to be diffused twice in the Y-axis direction. Thereby, the light emitted from the light source unit 106 can be formed into a line-shaped light distribution pattern extending in the Y-axis direction. In addition, as will be described later, color breaking can also be prevented in this light distribution pattern.

The liquid crystal light control element 102 according to the present invention includes the plurality of liquid crystal cells and has a structure in which at least one liquid crystal cell and one other liquid crystal cell adjacent to (overlapping) that at least one liquid crystal cell is superimposed in a 90-degree rotation, which prevents color breaking in the light distribution pattern. The effect of rotating the liquid crystal cells by 90 degrees can be attributed to the asymmetry of the liquid crystal, such as the direction of pre-tilt. Therefore, each liquid crystal cell should be arranged so as to break the asymmetry of the liquid crystal. More specifically, as shown in FIG. 14, the alignment direction of the first substrate S11 side of the first liquid crystal cell 10 faces the plus X direction, while the alignment direction of the second substrate S42 side of the fourth liquid crystal cell 40 faces the minus X direction. Other combinations can also be employed, for example, a configuration in which the alignment direction of the second substrate S12 side of the first liquid crystal cell 10 and the first substrate S41 side of the fourth liquid crystal cell 40 are aligned in the Y direction while facing each other. Similarly, a configuration in which the alignment direction of the first substrate S21 side of the second liquid crystal cell 20 and the second substrate S32 side of the third liquid crystal cell 30 are aligned in the X direction while facing each other, and the alignment direction of the second substrate S22 side of the second liquid crystal cell 20 and the first substrate S31 side of the third liquid crystal cell 30 are aligned in the Y direction while facing each other can be adopted.

Figure 15A:
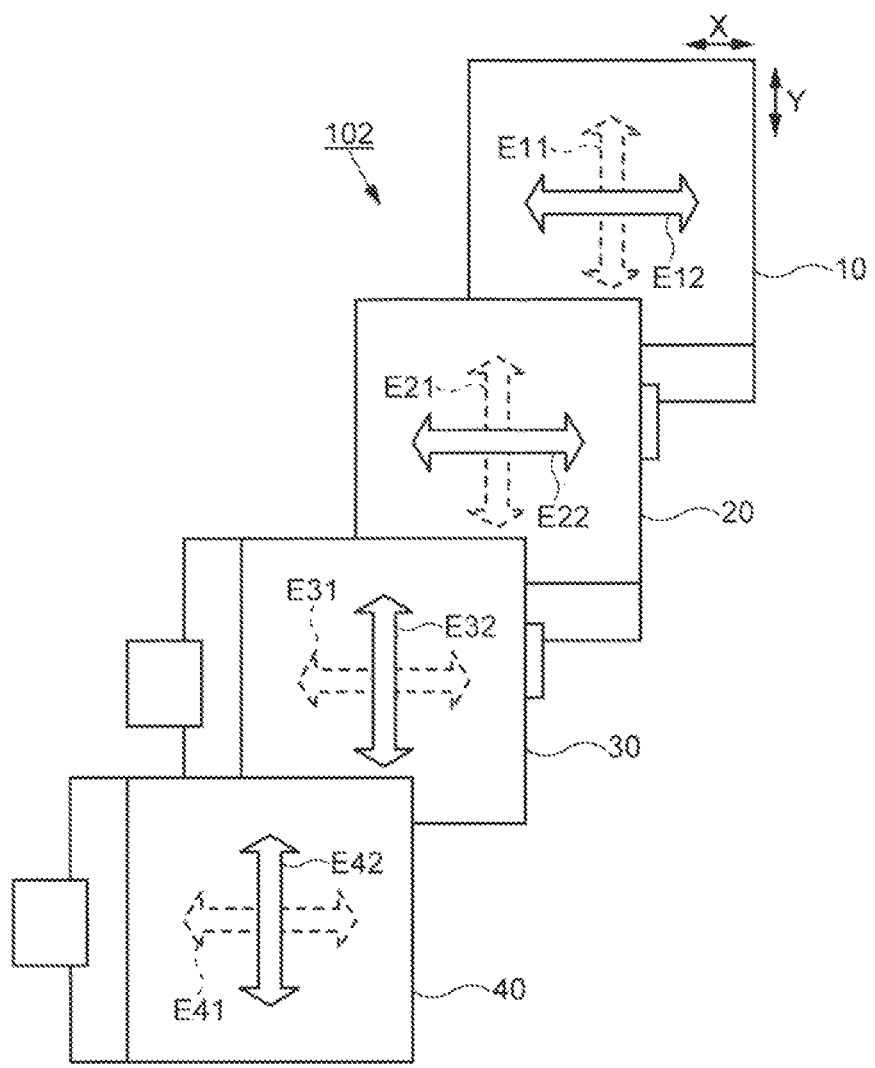
FIG. 15A is an arrangement of a plurality of liquid crystal cells configuring a liquid crystal light control element according to an embodiment of the present invention, with a first liquid crystal cell and a second liquid crystal cell rotated by 90 degrees.

FIG. 15A and FIG. 15B, and FIG. 16A and FIG. 16B show examples of the arrangement of the liquid crystal cells of the liquid crystal light control element 102. FIG. 15A shows an example in which the first liquid crystal cell 10 and the second liquid crystal cell 20 are arranged as one pair, and the third liquid crystal cell 30 and the fourth liquid crystal cell 40 are arranged as one pair, with the other pair rotated 90 degrees with respect to one pair. This arrangement corresponds to the arrangement in FIG. 2 and FIG. 3.

Figure 15B:
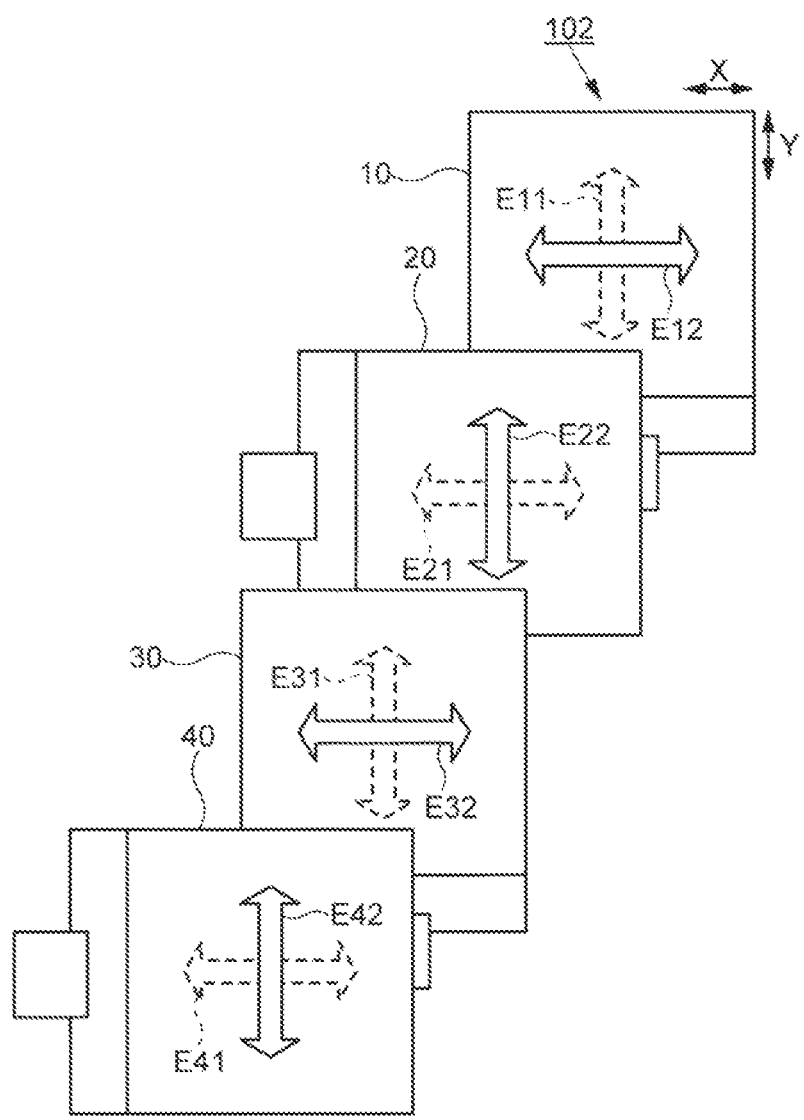
FIG. 15B is an arrangement of a plurality of liquid crystal cells configuring a liquid crystal light control element according to an embodiment of the present invention, with a first liquid crystal cell and a third liquid crystal cell rotated by 90 degrees.

FIG. 15B shows a configuration in which the odd-numbered liquid crystal cell is arranged rotated 90 degrees relative to the even-numbered liquid crystal cell among the four liquid crystal cells. In other words, FIG. 15B shows a configuration in which the even-numbered liquid crystal cell is arranged at a 90 degree rotation relative to the odd-numbered liquid crystal cell.

Figure 16B:
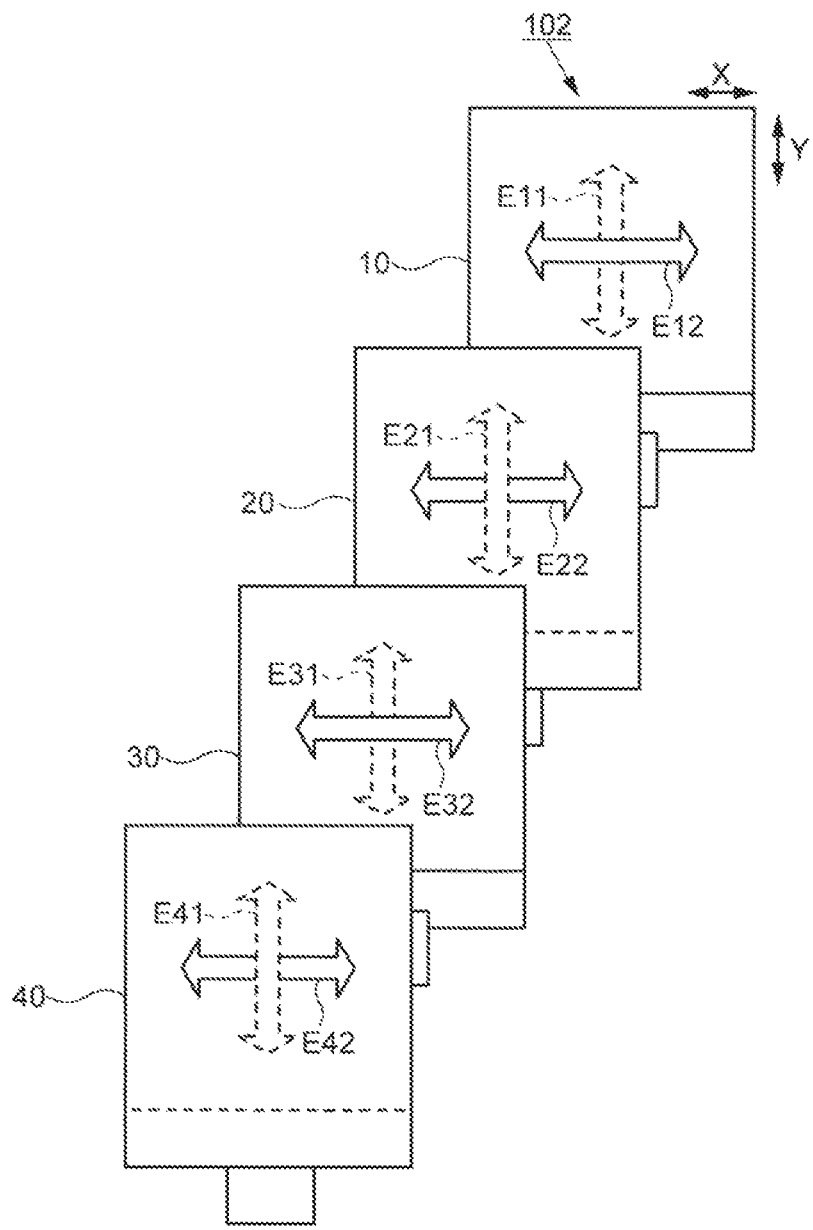
FIG. 16B is an arrangement of a plurality of liquid crystal cells configuring a liquid crystal light control element according to an embodiment of the present invention, with a first liquid crystal cell and a third liquid crystal cell inverted.

FIG. 16A shows a combination of the first liquid crystal cell 10, the second liquid crystal cell 20, the third liquid crystal cell 30, and the fourth liquid crystal cell 40, each rotated 90 degrees. FIG. 16B shows the combination of the first liquid crystal cell 10 and the third liquid crystal cell 30 flipped front-to-back.

Here, the first electrodes E11, E21, E31, and E41 are the electrodes formed on the first substrate S11 (bottom side) and the second electrodes E12, E22, E32, and E42 are the electrodes formed on the second substrate S12 (top side), in FIG. 15A and FIG. 15B, and FIG. 16A and FIG. 16B. As described in FIG. 3, the first electrode E11 includes the first strip electrode (E11A) and the second strip electrode (E11B), and the second electrode E12 includes the third strip electrode (E12A) and the fourth strip electrode (E12B). The same is true for the first electrodes E21, E31, E41 and the second electrodes E22, E32, E42. The direction of the arrow indicates the longitudinal direction of the strip electrodes, in FIG. 15A and FIG. 15B, and FIG. 16A and FIG. 16B.

The liquid crystal light control element 102 shown in FIG. 15A has the longitudinal direction of the strip patterns of the first electrode E11 of the first liquid crystal cell 10 and the first electrode E21 of the second liquid crystal cell arranged parallel to the Y-axis direction, the longitudinal direction of the strip patterns of the second electrode E12 of the first liquid crystal cell 10 and the second electrode E22 of the second liquid crystal cell 20 are arranged in a direction parallel to the X-axis direction, and the longitudinal direction of the strip patterns of the first electrode E31 of the third liquid crystal cell 30 and the first electrode E41 of the fourth liquid crystal cell 40 are arranged in a direction parallel to the X-axis direction. According to this combination of electrode arrangements of each liquid crystal cell, the diffusion direction of polarized components can be controlled at least twice in different liquid crystal cells, preventing color breaking of the arranged illumination light distribution.

In the liquid crystal light control element 102 shown in FIG. 15B, FIG. 16A and FIG. 16B, the longitudinal direction of the strip patterns of the first electrode E11 of the first liquid crystal cell 10 and the first electrode E31 of the third liquid crystal cell 30 is arranged parallel to the Y-axis direction, the longitudinal direction of the strip patterns of the second electrode E12 of the first liquid crystal cell 10 and the second electrode E32 of the third liquid crystal cell 30 is arranged parallel to the X-axis direction, the longitudinal direction of the strip patterns of the first electrode E21 of the second liquid crystal cell 20 and the first electrode E41 of the fourth liquid crystal cell 40 are arranged in a direction parallel to the X-axis direction, and the longitudinal direction of the strip patterns of the second electrode E22 of the second liquid crystal cell 20 and the second electrode E42 of the fourth liquid crystal cell 40 are arranged parallel to the Y-axis direction. This combination of electrode arrangements of each liquid crystal cell allows the diffusion direction of polarized components to be controlled at least twice in different liquid crystal cells, preventing color breaking of the distributed illumination light.

As explained in this embodiment, the diffusion of the same polarized component of the incident light is controlled by electrodes at different positions of different liquid crystal cells (for example, the second electrode E12 of the first liquid crystal cell 10 and the first electrode E11 of the fourth liquid crystal cell 40) in the liquid crystal light control element 102 in which the plurality of liquid crystal cells are stacked, thereby color breaking in the light distribution pattern can be prevented.

As explained above, the present embodiment can suppress color breaking in a light distribution pattern molded into a predetermined shape in a liquid crystal light control device that uses the electro-optic effect of a liquid crystal to control the light distribution of the illumination light.

The present invention is not limited to the embodiments disclosed herein, but can be embodied by transforming the configuration elements to the extent that it does not depart from the gist of the invention. Also, various inventions can be formed by appropriate combinations of the plurality of configurations disclosed in the embodiments herein. For example, some configuration elements may be deleted from all the configuration elements shown in the embodiments. Further, the configuration elements across different embodiments may be combined as appropriate.

What is claimed is:

1. A liquid crystal light control device, comprising:
a first liquid crystal cell;
a second liquid crystal cell overlapping the first liquid crystal cell;
a third liquid crystal cell overlapping the second liquid crystal cell; and
a fourth liquid crystal cell overlapping the third liquid crystal cell;
each of the first liquid crystal cell, the second liquid crystal cell, the third liquid crystal cell, and the fourth liquid crystal cell include:
a first substrate arranged with a first electrode having a strip pattern and a first alignment film, a first alignment direction of the first alignment film intersecting a longitudinal direction of the strip pattern of the first electrode;
a second substrate arranged with a second electrode having a strip pattern and a second alignment film, a second alignment direction of the second alignment film intersecting a longitudinal direction of the strip pattern of the second electrode and the first alignment direction; and
a liquid crystal layer between the first substrate and the second substrate, a long axis direction of liquid crystal molecules in the liquid crystal layer aligned according to both of the alignment directions of the first and second alignment films so as to rotate horizontally from the first alignment direction of the first alignment film to the second alignment direction of the second alignment film from the first substrate side to the second substrate side,
wherein:
the first substrate and second substrate are arranged with the longitudinal directions of the strip patterns of the first electrode and second electrode intersecting, and
two of the first liquid crystal cell, the second liquid crystal cell, the third liquid crystal cell, and the fourth liquid crystal cell are arranged with the longitudinal direction of the strip pattern of the first electrode parallel to a first direction, and the longitudinal direction of the strip pattern of the first electrode of the other two liquid crystal cells is parallel to a second direction that intersects the first direction.

2. The liquid crystal light control device according to claim 1, wherein:
the first electrode of the first liquid crystal cell and the first electrode of the second liquid crystal cell are arranged with the longitudinal direction of the strip pattern parallel to the first direction,
the second electrode of the first liquid crystal cell and the second electrode of the second liquid crystal cell are arranged with the longitudinal direction of the strip pattern parallel to the second direction,
the first electrode of the third liquid crystal cell and the first electrode of the fourth liquid crystal cell are arranged with the longitudinal direction of the strip pattern parallel to the second direction, and
the second electrode of the third liquid crystal cell and the second electrode of the fourth liquid crystal cell are arranged with the longitudinal direction of the strip pattern parallel to the first direction.

3. The liquid crystal light control device according to claim 1, wherein:
the first electrode of the first liquid crystal cell and the first electrode of the third liquid crystal cell are arranged with the longitudinal direction of the strip pattern parallel to the first direction,
the second electrode of the first liquid crystal cell and the second electrode of the third liquid crystal cell are arranged with the longitudinal direction of the strip pattern parallel to the second direction,
the first electrode of the second liquid crystal cell and the first electrode of the fourth liquid crystal cell are arranged with the longitudinal direction of the strip pattern parallel to the second direction, and
the second electrode of the second liquid crystal cell and the second electrode of the fourth liquid crystal cell are arranged with the longitudinal direction of the strip pattern parallel to the first direction.

4. The liquid crystal light control device according to claim 3, wherein:
the second substrate of the first liquid crystal cell is adjacent to the second substrate of the second liquid crystal cell,
the first substrate of the second liquid crystal cell is adjacent to the first substrate of the third liquid crystal cell, and
the second substrate of the third liquid crystal cell is adjacent to the second substrate of the fourth liquid crystal cell.

5. The liquid crystal light control device according to claim 1, wherein:
the first electrode includes at least one first strip electrode having the strip pattern and at least one second strip electrode having the strip pattern, and the at least one first strip electrode and the at least one second strip electrode are arranged apart and alternately, and
the second electrode includes at least one third strip electrode having the strip pattern and at least one fourth strip electrode having the strip pattern, and the at least one third strip electrode and the at least one fourth strip electrode are arranged apart and alternately.

6. The liquid crystal light control device according to claim 5, wherein the first electrode generates a transverse electric field between the first strip electrode and the second strip electrode, and the second electrode generates a transverse electric field between the third strip electrode and the fourth strip electrode.

7. The liquid crystal light control device according to claim 5, wherein a thickness of the liquid crystal layer of the first liquid crystal cell, the second liquid crystal cell, the third liquid crystal cell, and the fourth liquid crystal cell is at least one times or greater than a distance between centers of the first strip electrode and the second strip electrode.

8. The liquid crystal light control device according to claim 5, wherein each of the first liquid crystal cell, second liquid crystal cell, third liquid crystal cell, and fourth liquid crystal cell has a thickness where the liquid crystal layer does not interfere with a transverse electric field generated at the first electrode and a transverse electric field generated at the second electrode.

9. The liquid crystal light control device according to claim 1, wherein the liquid crystal layer is a twisted nematic liquid crystal.

* * * * *